US008275824B2

(12) United States Patent
Jung et al.

(10) Patent No.: US 8,275,824 B2
(45) Date of Patent: *Sep. 25, 2012

(54) OCCURRENCE DATA DETECTION AND STORAGE FOR MOTE NETWORKS

(75) Inventors: Edward K. Y. Jung, Bellevue, WA (US); Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 144 days.

This patent is subject to a terminal disclaimer.

(21) Appl. No.: 12/454,171

(22) Filed: May 12, 2009

(65) Prior Publication Data

US 2009/0282156 A1  Nov. 12, 2009

Related U.S. Application Data

(63) Continuation-in-part of application No. 10/903,692, filed on Jul. 30, 2004, now Pat. No. 7,457,834, and a continuation-in-part of application No. 12/286,736, filed on Sep. 30, 2008, and a continuation-in-part of application No. 10/909,200, filed on Jul. 30, 2004, and a continuation-in-part of application No. 10/903,652, filed on Jul. 30, 2004, now Pat. No. 7,536,388.

(51) Int. Cl.
  G06F 15/16 (2006.01)
(52) U.S. Cl. ........ 709/200; 709/217; 707/661; 707/662; 707/665
(58) Field of Classification Search .................. 709/200, 709/217; 707/661, 662, 665
  See application file for complete search history.

(56) References Cited

U.S. PATENT DOCUMENTS

| 4,308,911 | A | | 1/1982 | Mandl |
| 4,761,641 | A | * | 8/1988 | Schreiber ........................ 345/1.3 |
| 5,159,631 | A | | 10/1992 | Quan et al. |
| 5,321,396 | A | * | 6/1994 | Lamming et al. .............. 340/8.1 |
| 5,394,882 | A | | 3/1995 | Mawhinney |
| 5,432,519 | A | | 7/1995 | Sezai |
| 5,539,665 | A | * | 7/1996 | Lamming et al. ............. 709/224 |
| 5,581,694 | A | | 12/1996 | Iverson et al. |
| 5,615,367 | A | | 3/1997 | Bennett et al. |
| 5,697,066 | A | | 12/1997 | Acampora |
| 5,796,951 | A | | 8/1998 | Hamner et al. |
| 5,960,214 | A | | 9/1999 | Sharpe, Jr. et al. |
| 6,088,665 | A | | 7/2000 | Burns et al. |

(Continued)

OTHER PUBLICATIONS

David Patnode and Joseph Dunne, WISENET, spring 2003, Senior Design Project, pp. 1-26.*

(Continued)

*Primary Examiner* — Glenton B Burgess
*Assistant Examiner* — Oleg Survillo

(57) ABSTRACT

Systems and processes for detecting and storing occurrence data using mote networks are disclosed. In some embodiments, a system includes a computing component coupled with a data storage device and operable to receive data from one or more motes. Instructions on the data storage device configure the computing component to receive data from one or more motes into a received data set, receive an input selection corresponding to a target-occurrence having a representative feature, the representative feature including at least one recognizable pattern of at least one parameter in the data received from the one or more of the motes, select a pattern recognition criteria corresponding one of the representative features of the target-occurrence, and in response to the input selection corresponding to the target-occurrence, automatically search the received data set for data correlating to the target-occurrence representative feature using the selected pattern recognition criteria.

24 Claims, 22 Drawing Sheets

U.S. PATENT DOCUMENTS

| | | | |
|---|---|---|---|
| 6,124,806 A | 9/2000 | Cunningham et al. |
| 6,131,119 A | 10/2000 | Fuki |
| 6,187,483 B1 | 2/2001 | Capodieci et al. |
| 6,208,247 B1 | 3/2001 | Agre et al. |
| 6,229,486 B1 | 5/2001 | Krile |
| 6,296,205 B1 | 10/2001 | Hanson et al. |
| 6,344,797 B1 | 2/2002 | Hosny |
| 6,421,354 B1 | 7/2002 | Godlewski et al. |
| 6,496,766 B1 | 12/2002 | Bernold et al. |
| 6,504,829 B1 | 1/2003 | Young et al. |
| 6,505,205 B1 | 1/2003 | Kothuri et al. |
| 6,510,403 B1 | 1/2003 | Ghaseminejad |
| 6,618,745 B2 | 9/2003 | Christensen et al. |
| 6,640,087 B2 | 10/2003 | Reed et al. |
| 6,640,145 B2 | 10/2003 | Hoffberg et al. |
| 6,691,070 B1 | 2/2004 | Williams et al. |
| 6,704,742 B1 | 3/2004 | Huth et al. |
| 6,708,239 B1 | 3/2004 | Ellerbrock et al. |
| 6,735,630 B1 | 5/2004 | Gelvin et al. |
| 6,778,844 B2 | 8/2004 | Hood, III |
| 6,792,321 B2 | 9/2004 | Sepe, Jr. |
| 6,826,162 B2 | 11/2004 | Haines et al. |
| 6,856,247 B1 | 2/2005 | Wallace |
| 6,870,503 B2 | 3/2005 | Mohamadi |
| 6,888,453 B2 | 5/2005 | Lutz et al. |
| 6,924,727 B2 | 8/2005 | Nagaoka et al. |
| 6,943,747 B2 | 9/2005 | Kwon |
| 6,950,778 B2 | 9/2005 | Warner et al. |
| 6,999,957 B1 * | 2/2006 | Zamir et al. | 707/673 |
| 7,004,401 B2 | 2/2006 | Kallestad |
| 7,016,812 B2 | 3/2006 | Aritsuka et al. |
| 7,019,637 B1 | 3/2006 | Johnson et al. |
| 7,034,740 B2 | 4/2006 | Witten |
| 7,075,455 B2 | 7/2006 | Nishimura et al. |
| 7,103,511 B2 | 9/2006 | Petite |
| 7,165,109 B2 | 1/2007 | Chiloyan et al. |
| 7,167,859 B2 | 1/2007 | Shah et al. |
| 7,203,693 B2 * | 4/2007 | Carlbom et al. | 1/1 |
| 7,446,801 B2 | 11/2008 | Iizuka |
| 7,472,135 B2 * | 12/2008 | Huuskonen | 1/1 |
| 7,475,158 B2 | 1/2009 | Ferri et al. |
| 7,665,126 B2 | 2/2010 | Simon et al. |
| 7,683,933 B2 | 3/2010 | Tanaka |
| 2001/0027495 A1 | 10/2001 | Campagnolo |
| 2002/0027504 A1 | 3/2002 | Davis et al. |
| 2002/0036595 A1 | 3/2002 | Chiang et al. |
| 2002/0040639 A1 | 4/2002 | Duddleson et al. |
| 2002/0095501 A1 | 7/2002 | Chiloyan et al. |
| 2002/0095568 A1 | 7/2002 | Norris |
| 2002/0123864 A1 | 9/2002 | Eryurek et al. |
| 2002/0161751 A1 | 10/2002 | Mulgund et al. |
| 2002/0165933 A1 | 11/2002 | Yu et al. |
| 2003/0014084 A1 * | 1/2003 | VanHout | 607/9 |
| 2003/0016128 A1 | 1/2003 | Lutz et al. |
| 2003/0026268 A1 | 2/2003 | Navas |
| 2003/0033394 A1 | 2/2003 | Stine |
| 2003/0058111 A1 * | 3/2003 | Lee et al. | 340/573.1 |
| 2003/0063585 A1 | 4/2003 | Younis et al. |
| 2003/0135495 A1 | 7/2003 | Vagnozzi |
| 2003/0151513 A1 | 8/2003 | Herrmann et al. |
| 2003/0172221 A1 | 9/2003 | McNeil |
| 2003/0222818 A1 | 12/2003 | Regnier et al. |
| 2003/0228857 A1 | 12/2003 | Maeki |
| 2003/0236866 A1 | 12/2003 | Light |
| 2004/0005889 A1 | 1/2004 | Nishimura et al. |
| 2004/0008140 A1 | 1/2004 | Sengupta et al. |
| 2004/0010492 A1 | 1/2004 | Zhao et al. |
| 2004/0071460 A1 | 4/2004 | Nishimura et al. |
| 2004/0075549 A1 * | 4/2004 | Haller | 340/522 |
| 2004/0078117 A1 | 4/2004 | Vanderah et al. |
| 2004/0090326 A1 | 5/2004 | Chin et al. |
| 2004/0122849 A1 | 6/2004 | Nelson |
| 2004/0137915 A1 | 7/2004 | Diener et al. |
| 2004/0139110 A1 | 7/2004 | LaMarca et al. |
| 2004/0144849 A1 | 7/2004 | Ahmed |
| 2004/0158627 A1 | 8/2004 | Thornton |
| 2004/0186826 A1 | 9/2004 | Choi et al. |
| 2004/0218602 A1 | 11/2004 | Hrastar et al. |
| 2004/0230638 A1 | 11/2004 | Balachandran et al. |
| 2004/0240542 A1 * | 12/2004 | Yeredor et al. | 375/240.01 |
| 2004/0249563 A1 | 12/2004 | Otsuki et al. |
| 2004/0262410 A1 | 12/2004 | Hull |
| 2004/0267729 A1 | 12/2004 | Swaminathan et al. |
| 2005/0021724 A1 | 1/2005 | Kung et al. |
| 2005/0043907 A1 | 2/2005 | Eckel et al. |
| 2005/0062653 A1 | 3/2005 | Cetiner et al. |
| 2005/0085248 A1 | 4/2005 | Ballay et al. |
| 2005/0140964 A1 | 6/2005 | Eschenauer et al. |
| 2005/0141706 A1 | 6/2005 | Regli et al. |
| 2005/0143133 A1 | 6/2005 | Bridgelall |
| 2005/0275532 A1 | 12/2005 | Ferri et al. |
| 2006/0018516 A1 * | 1/2006 | Masoud et al. | 382/115 |
| 2006/0053459 A1 * | 3/2006 | Simerly et al. | 725/105 |
| 2006/0092042 A1 | 5/2006 | Davis et al. |
| 2006/0136627 A1 | 6/2006 | Maity et al. |
| 2006/0206235 A1 | 9/2006 | Shakes et al. |
| 2006/0212570 A1 | 9/2006 | Aritsuka et al. |
| 2006/0224434 A1 | 10/2006 | Rumi et al. |
| 2007/0035410 A1 | 2/2007 | Cohen et al. |
| 2007/0208841 A1 | 9/2007 | Barone et al. |
| 2007/0214133 A1 | 9/2007 | Liberty et al. |
| 2007/0262863 A1 | 11/2007 | Aritsuka et al. |
| 2008/0003948 A1 | 1/2008 | Mitran |
| 2008/0100450 A1 | 5/2008 | Ayyagari et al. |
| 2008/0129495 A1 | 6/2008 | Hitt |
| 2008/0234581 A1 | 9/2008 | Paltieli et al. |
| 2009/0019447 A1 | 1/2009 | Hellerstein et al. |
| 2009/0063187 A1 | 3/2009 | Johnson et al. |
| 2009/0067586 A1 | 3/2009 | Fano et al. |
| 2009/0195401 A1 | 8/2009 | Maroney et al. |
| 2010/0168989 A1 | 7/2010 | Gao et al. |
| 2010/2747753 | 10/2010 | Liberty et al. |

OTHER PUBLICATIONS

Adler, Robert et al.; "Demo Abstract: Intel Mote 2: An Advanced Platform for Demanding Sensor Network Applications"; Intel Corporation; bearing dates of Nov. 2-4, 2005; p. 298; (plus cover sheet).

Berkely Webs: Wireless Embedded Systems, "Building Sensor Networks with TinyOS", bearing a date of May 5, 2003 Mobisys Tutorial, San Francisco Powerpoint Presentation, Culler, David; Levis, Phil; Szewczyk, Rob; Polastre, Joe; pp. 1-41 located at http://webs.cs.berkeley.edu, printed Apr. 15, 2004.

Berkeley Webs: Wireless Embedded Systems, "Publications", p. 1-3, located at http://webs.cs.berkeley.edu/publications.html, printed on Apr. 12, 2004.

Berkeley Webs: Wireless Embedded Systems, "Tiny OS a component-based OS for the networked sensor regime" pp. 1-2 located at http://webs.cs.berkeley.edu/tos/, printed Jan. 27, 2004.

Berkeley Webs: Wireless Embedded Systems, "Tiny OS a component-based OS for the networked sensor regime", "Publications/Presentations", pp. 1-3 located at http://www.tinyos.net/media.html, printed Apr. 13, 2004.

Berkeley Webs: Wireless Embedded Systems, "Tiny OS a component-based OS for the networked sensor regime" pp. 1-9 located at http://webs.cs.berkeley.edu/tos/related.html, printed on Jan. 27, 2004.

Berkeley Webs: Wireless Embedded Systems, "Tiny OS Tutorial Index", pp. 1-2 located at http://webs.cs.berkeley.edu/tos/timyos-1.x/doc/tutorial/index.html, printed on Apr. 15, 2004.

Berkeley Webs: Wireless Embedded Systems, "Tiny OS Tutorial Lesson 8: Data Logging Application", pp. 1-4 located at http://webs.cs.berkeley.edu/tos/tinyos-1.x/doc/tutorial/lesson8.html, printed on Apr. 15, 2004.

Buonadonna, Phillip; Hill, Jason; Culler, David; "Active Message Communication for Tiny Networked Sensors," pp. 1-11, printed on Mar. 8, 2004.

Center for the Built Environment, "XYZ On A Chip: Integrated Wireless Sensor Networks for the Control of the Indoor Environment in Buildings" pp. 1-2, located at http://www.cbe.berkeley.edu/research/briefs-wirelessxyz.htm, bearing a dated of 2002, printed on Jan. 27, 2004.

Citris, "Brainy Buildings Conserve Energy" p. 1-3 located at http://www.citris.berkeley.edu/applications/energy/smartbuildings.html, printed on Jan. 27, 2004.

Citris, "The Real World as One Giant Database" pp. 1-3 located at http://www.citris.berkeley.edu/newsletter/2003_Newsletters/december_2003/feature.htm, bearing a date of 2003, printed on Apr. 9, 2004.
Culler, David, et al.; "Building Sensor Networks with TinyOS"; University of California, Berkeley, Inter Research Berkeley, May 5, 2003; pp. 1-41.
Culler, David; Estrin, Deborah; Srivastava, Mani; "Overview of Sensor Networks"; Computer; Aug. 2004; pp. 41-49; vol. 37; No. 8; IEEE Computer Society.
Culler, David E.; Mulder, Hans; "Smart Sensors to Network the World"; Scientific American; printed on Jun. 26, 2007; pp. 1-10; http://www.intel.com/research/exploratory/smartnetworks.htm.
"Data Repository", University of California Berkeley, located at http://localization.millennium.berkeley.edu/data_repository.html, pp. 1 of 1, bearing a date of 2001, printed on Apr. 7, 2004.
Dutta, Prabal K. et al.; "System Software Techniques for Low-Power Operation in Wireless Sensor Networks"; Computer Science Division, University of California, Berkeley; bearing a date of 2005; pp. 924-931; (plus cover sheet).
Fall, Kevin; "A Delay-Tolerant Network Architecture for Challenged Internets"; Intel Research Berkeley; Feb. 26, 2003; pp. 1-14; ACM Press.
Gay, David; Levis, Phil; Von Behren; Welsh, Matt; Brewer, Eric; and Culler, David, "The nesCLanguage: A Holistic Approach to Network Embedded Systems," pp. 1-11; Intel Research Berkeley, The Intel Corporation, Bearing a date of Nov. 2002.
Gelsinger, Pat; Intel.com, "Expanding Moore's Law with Convergance" pp. 1-4 located at http://www.intel.com/labs/features/em101031.htm, printed on Apr. 9, 2004.
Govindan, Ramesh; Kohler, Eddie; Estrin, Deborah; Bian, Fang; Chintalapudi, Krishna; Gnawali, Om; Gummadi, Ramakrishna; Rangwala, Sumit; Stathopoulos, Thanos; "Tenet: An Architecture for Tiered Embedded Networks"; 2005; pp. 1-8
Hill, Jason; Szewczyk, Robert; Woo, Alec; Hollar, Seth; Culler, David; Pister, Kristofer, "System Architecture Directions for Networked Sensors," ASPLOS 2000, Cambridge, Bearing a date of Nov. 2000, pp. 1-12.
Kaminsky et al.; "Decentralized User Authentication in a Global File System"; ACM; bearing a date of Dec. 2003; pp. 60-73; vol. 37, Issue 5, Bolton Landing, New York.
Krause, Andreas et al.; "Near-optimal Sensor Placements: Maximizing Information while Minimizing Communication Cost"; bearing dates of Apr. 19-21, 2006; pp. 2-10; (plus cover sheets).
INTEL.COM, "New Computing Frontiers—The Wireless Vineyard" pp. 1-4 located at http://www.intel.com/labs/features/rs01031.htm, printed on Apr. 7, 2004.
INTEL.COM, "Exploratory Research Deep Networking" pp. 1-10 located at http://www.intel.com/research/exploratory/heterogenerous.htm, printed on Mar. 25, 2004.
ISIS NEST: Institute for Software Integrated Systems; "NEST Home: Network Embedded Systems Technology", pp. 1-2, located at http://www.isis.vanderbilt.edu/projects.nest/index.html, printed on Apr. 14, 2004.
ISIS NEST: Institute for Software Integrated Systems; "Applications: Shooter Localizations", pp. 1-5, located at http://www.isis.vanderbilt.edu/projects.nest/applications.html, printed on Apr. 14, 2004.
ISIS NEST: Institute for Software Integrated Systems; "Middleware: Next Middleware Services", pp. 1 of 1, located at http://www.isis.vanderbilt.edu/projects.nest/middleware.html, printed on Apr. 14, 2004.
ISIS NEST: Institute for Software Integrated Systems; "Tools: NEST Tools", pp. 1 of 1, located at http://www.isis.vanderbilt.edu/projects.nest/tools.ntml, printed on Apr. 14, 2004.
ISIS NEST: Institute for Software Integrated Systems; "Documents: NEST Documents", pp. 1-2, located at http://www.isis.vanderbilt.edu/projects.nest/documetns.html, printed on Apr. 14, 2004.
ISIS NEST: Institute for Software Integrated Systems; "Download: NEST Download", pp. 1-2, located at http://www.isis.vanderbilt.edu/projects.nest/download.html, printed on Apr. 14, 2004.
ISIS NEST: Institute for Software Integrated Systems; "People: The NEST Group", pp. 1 of 1, located at http://www.isis.vanderbilt.edu/projects.nest/people.html, printed on Apr. 14, 2004.
Johnson, R. Colin, "Companies test prototype wireless-sensor nets" EE Times, pp. 1-3, printable version of article located at http://www.eet.com/article/showArticle.jhtml?articleID=9900910, bearing a date of Jan. 29, 2003, printed on Jan. 27, 2004.
Kahn, Kevin C.; Culler, David E.; "Ad Hoc Sensor Networks a New Frontier for Computing Applications", Bearing a date of Apr. 2002, printed on Apr. 9, 2004, p. 1-4.
Kling, Ralph, "Intel® Research Mote" pp. 1-13, Powerpoint Presentation, located at http://webs.cs.berkeley.edu/retreat-1-03/slides/imote-nest-q103-03-dist.pdf , Intel Corporation Research, Santa Clara, CA, printed on Apr. 13, 2004.
Levis, Philip; Culler, David; "Maté: A Tiny Virtual Machine for Sensor Networks", pp. 1-11, printed on Apr. 12, 2004.
Levis, Philip; Patel, Neil; "Maté: Building Application-Specific Sensor Network Language Runtimes", Nov. 11, 2003, printed on Apr. 12, 2004, pp. 1-3.
Levis, Philip; Madden, Sam; Gay, David; Polastre, Joseph; Szewczyk, Robert; Woo, Alec; Brewer, Eric; Culler, David; "The Emergence of Networking Abstractions and Techniques in TinyOS" pp. 1-14, printed on Apr. 13, 2004.
Levis, Philip; Patel, Neil; Culler, David; Shenker, Scott; "Trickle: A Self-Regulating Algorithm for Code Propagation and Maintenance in Wireless Sensor Networks", printed on Apr. 13, 2004, pp. 1-14.
Levis, Philip, "Viral Code Propagation in Wireless Sensor Networks," EECS Department, University of California at Berkeley, printed on Mar. 8, 2004, pp. 1-7.
Li, Xin; Kim, Young Jin; Govindan, Ramesh; Hong, Wei; "Multi-dimensional Range Queries in Sensor Networks"; bearing dates of Nov. 5-7, 2003; pp. 63-75; ACM; located at http://www.cens.ucla.edu/sensys03/proceedings/p63-li.pdf.
Liscano, Ramiro, "Service Discovery in Sensor Networks: An Overview" Powerpoint Presentation; pp. 1-51; School of Information Technology and Engineering, University of Ottawa, Ottawa, Canada, bearing a date of 2003, printed on Mar. 8, 2004.
"Localization Distributed Embedded Systems" UCLA Computer Science 213: Localization Systems Powerpoint Presentation, pp. 1-61, bearing a course name of: CS 213/Estrin/Winter 2003, bearing a speaker name of: Lewis Girod, bearing a date of Feb. 4, 2003, printed on Mar. 15, 2004.
"Localization Standards", University of California Berkeley, located at http://localization.millenium.berkeley.edu/localization_standards.html, pp. 1 of 1, bearing a date of 2001, printed on Apr. 7, 2004.
Lu, Jie; Callan, Jamie; "Content-Based Retrieval in Hybrid Peer-To-Peer Networks"; CIKM'03; bearing dates of Nov. 3-8, 2003; ACM.
Lu, Jie et al.; "User Modeling for Full-Text Federated Search in Peer-to-Peer Networks"; Language Technologies Institute, Carnegie Mellon University; bearing dates of Aug. 6-11, 2006; pp. 332-339; (plus cover sheet).
Madden, Samuel, "Acquisitional Query Processing in TinyDB" Powerpoint Presentation, pp. 1-51; NEST Winter Retreat 2003, printed on Mar. 8, 2004.
Madden, Samuel, "Challenges in Sensor Network Query Processing" Powerpoint Presentation allegedly at the Jan. 15, 2002 NEST Retreat, printed on Mar. 8, 2004, pp. 1-56.
Madden, Samuel; Szewczyk, R.; Franklin, Michael; and Culler, David "Supporting Aggregate Queries Over Ad-Hoc Wireless Sensor Networks," pp. 1-10, printed on Mar. 8, 2004.
Madden, Samuel; Szewczyk, R.; Franklin, Michael; Culler, David "Supporting Aggregate Queries Over Ad-Hoc Wireless Sensor Networks" Powerpoint Presentation, pp. 1-47, 4th IEEE Workshop on Mobile Computing, dated Jun. 21, 2002.
Madden, Samuel, et al; "TAG; A Tiny Aggregation Service for Ad-Hoc Sensor Networks"; OSDI, located at http://www.cs.berkeley.edu/~franklin/Papers/madden_tag.pdf; printed on Aug. 9, 2007.
Madden, Samuel; Franklin, Michael J.; Hellerstein, Joseph; M., and Hong, Wei, "The Design of an Acquisitional Query Processor for Sensor Networks," pp. 1-14, SIGMOD, bearing a date of Jun. 2003.

Maróti, Miklós; Völgyesi, Péter; Simon, Gyula; Karsai, Gábor; Lédeczi, Akos; "Distributed Middleware Services Composition and Synthesis Technology"; pp. 1-8, IEEE, bearing a date of 2002, printed on Apr. 14, 2004.

Nachman, Lama et al.; "The Intel® Mote Platform: A Bluetooth*—Based Sensor Network for Industrial Monitoring"; Corporate Technology Group, Intel Corporation; bearing a date of 2005; pp. 1-6; (plus cover sheet).

Patnode, David et al.; "Wisenet"; Senior Design Project, Spring 2003; (May 2003); pp. 1-26; cover page, and abstract.

Patnode, et al.; "WISENET—TinyOS Based Wireless Network of Sensors", IEEE, bearing a date of Nov. 6, 2003; pp. 1-6; http://ieeexplore.ieee.org/.

PCT International Search Report; International App. No. PCT/US05/10955; pp. 1-2; Jun. 23, 2008.

PCT International Search Report; International App. No. PCT/US05/10953; pp. 1-3; Jun. 17, 2008.

PCT International Search Report; International App. No. PCT/US05/10954; pp. 1-4; Feb. 26, 2008.

PCT International Search Report; International App. No. PCT/US05/11225; pp. 1-3; dated Nov. 23, 2007.

PCT International Search Report; International App. No. PCT/US05/11207; Nov. 13, 2007.

PCT International Search Report; International App. No. PCT/US05/10842; Nov. 7, 2007.

PCT International Search Report; International App. No. PCT/US05/10059; Oct. 26, 2007.

PCT International Search Report; International App. No. PCT/US05/10251; Oct. 25, 2007.

PCT International Search Report; International App. No. PCT/US05/10249; Oct. 24, 2007.

PCT International Search Report; International App. No. PCT/US05/10253; Oct. 23, 2007.

PCT International Search Report; International App. No. PCT/US05/10250; Oct. 18, 2007.

PCT International Search Report; International App. No. PCT/US05/10254; Oct. 17, 2007.

PCT International Search Report; International App. No. PCT/US05/09703; Sep. 28, 2007.

PCT International Search Report; International App. No. PCT/US05/09641; Sep. 13, 2007.

PCT International Search Report; International App No. PCT/US05/10053; pp. 1-3; dated Aug. 10, 2007.

PCT International Search Report; International App. No. PCT/US05/09479; Jul. 17, 2007.

PCT International Search Report; International App No. PCT/US05/09640; Jul. 9, 2007.

PCT International Search Report; International App. No. PCT/US05/10843; pp. 1-3; dated Jul. 3, 2007.

PCT International Search Report; International App. No. PCT/US05/11203; pp. 1-2; dated Feb. 9, 2007.

PCT International Search Report; International App. No. PCT/US05/10054; pp. 1-3; dated Dec. 1, 2006.

PCT International Search Report; International App. No. PCT/US05/11202; Sep. 27, 2006.

Pescovitz, David, "Robugs: Smart Dust Has Legs" pp. 1-2, located at http://www.coe.berkeley.edu/labnotes/0903/pister_print.html, bearing a date of Sep. 2003, printed on Apr. 9, 2004.

Raghunathan, Vijay; Schurgers, Curt; Park, Sung; Srivastava, Mani B.; "Energy Aware Wireless Sensor Networks" pp. 1-17; Department of Electrical Engineering, University of California, Los Angeles; printed on Mar. 15, 2004.

Razeeb, Kafil M. et al.; "A Hybrid Network of Autonomous Sensor Nodes"; NMRC, University College Cork; bearing dates of Nov. 8-10, 2004; pp. 69-70; (plus cover sheet).

Ryer, Alex; *Light Measurement Handbook*, http://www.intl-light.com/handbook; pp. 1-64, copyright 1997, printed on Mar. 8, 2004.

Savvides, Andreas; "Hardware", pp. 1-3, located at http://nesl.ee.ucle.edu/projects/ahlos/hardware.htm, Networks and Embedded Systems Lab, University of California, Los Angeles; bearing a date of Jan. 18, 2003, printed on Feb. 23, 2004.

Savvides, Andreas; "Localization Forum", pp. 1 of 1, located at http://nesl.ee.ucla.edu/projects/ahlos/localization_forum.htm, Networks and Embedded Systems Lab, University of California, Los Angeles; bearing a date of Dec. 24, 2003, printed on Feb. 23, 2004.

SEARCHMOBILECOMPUTING.COM, "Ad-Hoc Network" pp. 1-3 located at http://searchmobilecomputing.techtarget.com/sDefinition/0,,sid40_gci213462,00.html, bearing a date of Apr. 11, 2003, printed on Mar. 8, 2004.

SEARCHNETWORKING.COM Definitions, "Jini" pp. 1-3 located at http://searchnetworking.techtarget.com/sDefinition/0,,sid7_gci212422,00.html, bearing a date of Apr. 10, 2003, printed on Mar. 8, 2004.

Sharifzadeh, Mehdi et al.; "Supporting Spatial Aggregation in Sensor Network Databases*"; Computer Science Department, University of Southern California; bearing dates of Nov. 12-13, 2004; pp. 166-175; (plus cover sheet).

Spyropoulos, Akis; Raghavendra, C.S., "Energy Efficient Communications in Ad Hoc Networks Using Directional Antennas," Dept. of Electrical Engineering-Systems, University of Southern California, bearing a date of 2002, printed on Feb. 23, 2004, pp. 1-9.

Stathopoulos, Thanos; Girod, Lewis; Heidemann, John; Estrin, Deborah; "Mote Herding for Tiered Wireless Sensor Networks"; Center For Embedded Networked Sensing; 2005; pp. 1-14; UCLA, Department of Computer Science / USC, Information Sciences Institute.

"The Ad-Hoc Localization System (AHLoS)" Networks and Embedded Systems Lab, University of California, Los Angeles; located at http://nesl.ee.ucla.edu/projects/ahlos/Default.htm, pp. 1-4, printed on Feb. 23, 2004.

"Tiny DB A Declarative Database for Sensor Networks" pp. 1-2, located at http://telegraph.cs.berkeley.edu/tinydb/ printed Apr. 9, 2004.

Tiny Sec: Link Layer Security for Tiny Devices, Calamari: A localization system for sensor networks: pp. 1-6, located at http://www.cs.berkeley.edu/~kamin/calamari/ printed on Apr. 12, 2004.

Viswanath, Kumar, "Adaptive, Integrated Multicast Routing for Group Communications in Ad-Hoc Networks" Powerpoint Presentation, pp. 1-12; Computer Engineering Department, University of California, Santa Cruz, printed on Mar. 8, 2004.

Woo, Alec et al.; "A Transmission Control Scheme for Media Accessing Sensor Networks"; ACM Mobiocom; located at http://www.cs.berkeley.edu/~awoo/awoo_mobicom.pdf; printed on Aug. 13, 2007.

Woo, Alec; Tong, Terence; and Culler, David, "Taming the Underlying Challenges of Reliable Multihop Routing in Sensor Networks," pp. 1-14, SenSys '03, Bearing a date of Nov. 5-7, 2003, Los Angeles, California, USA.

Zhao, Feng; Guibas, Leonidas J.; *Wireless Sensor Networks: An Information Processing Approach*. San Francisco: Morgan Kaufmann Publishers-Elsevier Inc., bearing a copyright date of 2004.

Fornaro et al.; "Tiny Sensor-Based Computers Could Help Track Wildlife"; News Release; bearing a date of Nov. 6, 2003; pp. 1-2; located at http://www.ncsu.edu/news/press_releases/03_11/321.pdf.

Glaser, Steven D.; "Some real-world applications of wireless sensor nodes"; SPIE Symposium on Smart Structures & Materials/NDE 2004; Mar. 14-18, 2004; pp. 1-12; San Diego, CA.

Greenstein, Benjamin et al.; "DIFS: A Distributed Index for Features in Sensor Networks"; bearing a date of 2003; pp. 1-11; located at http://lecs.cs.ucla.edu/~ben/papers/difs/pdf; printed on Apr. 6, 2010.

Madden et al.; "Tiny DB: In-Network Query Processing in TinyOS"; Version 0.4; pp. 1-46; Sep. 2003; printed on Apr. 27, 2009; located at: http://telegraph.cs.berkeley.edu/tinydb.pdf.

Warneke, Brett et al.; "Ultra-Low Power Communication Logic Circuits for Distributed Sensor Networks"; EECS 241; bearing a date of Spring 1998; pp. 1-7; UC Berkeley.

* cited by examiner

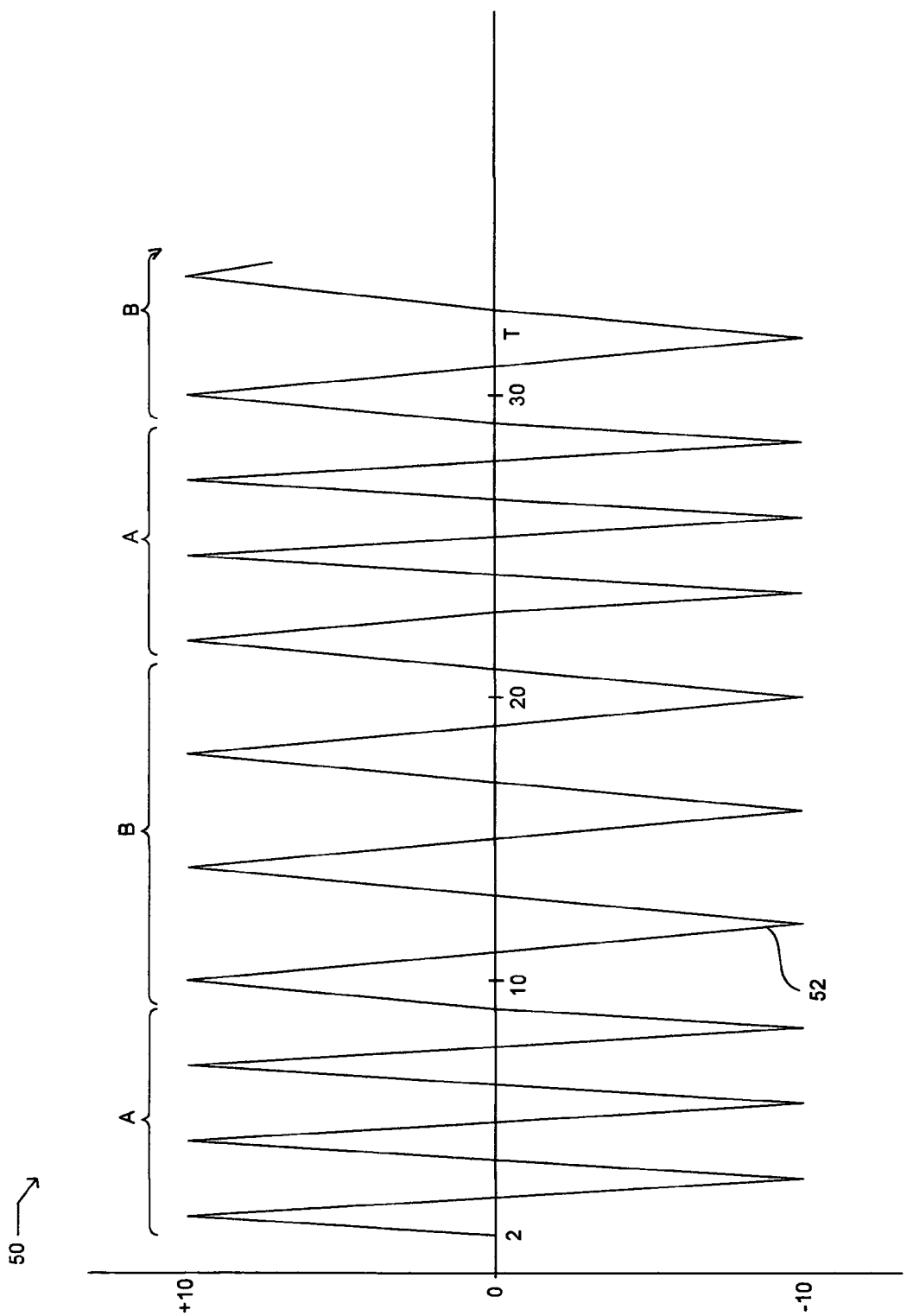

|   | Occurrence | Characteristic | Representative Feature |
|---|---|---|---|
| 1 | Car crash | a. Breaking glass<br>b. Impact noise<br>c. Tire screech<br>d. Emergency vehicles present | a. high and broadly distributed sound frequencies<br>b. middle frequency sounds<br>c. middle frequency sounds<br>d. "Do-dah, do-dah" siren sound pattern |
| 2 | Siren Sound | | "Do-dah, do-dah" siren sound pattern |
| 3 | Fire | a. Emergency vehicles present<br>b. fire alarm sound<br>c. heat<br>d. flames | a. "Do-dah, do-dah" siren sound pattern<br>b. various sound patterns<br>c. high temperatures<br>d. optical colors |
| 4 | Armored Convoy | a. heavy equipment rumble<br>b. ground shaking<br>c. olive-drab colored vehicles<br>d. diesel exhaust | a. low frequency sound<br>b. low frequency vibration<br>c. absence of yellow colors<br>d. airborne carbon particles |
| 5 | Assault | a. yelling and loud voices<br>b. breaking glass<br>c. gun shot | a. sound above a certain db for several seconds<br>b. high and broadly distributed sound frequencies<br>c. sounds greater than a certain db for less than a second |
| 6 | Gun shot | | Sounds greater than a certain db for less than a second |

Fig. 4

OCCURRENCE DATA DETECTION AND STORAGE FOR MOTE NETWORKS

CROSS REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)), and incorporates by reference in its entirety all subject matter of the following listed application(s) (in the event of any inconsistencies between the instant application and an application incorporated by reference, the instant application controls):

1. For purposes of the USPTO extra-statutory requirements, the present application constitutes a continuation-in-part application of U.S. patent application Ser. No. 10/903,692 entitled AGGREGATION AND RETRIEVAL OF NETWORK SENSOR DATA, naming Edward K.Y. Jung and Clarence T. Tegreene as inventors, filed on 30 Jul., 2004, now issued as U.S. Pat. No. 7,457,834, issued on 25 Nov., 2008, which is currently co-pending, or is an application of which a currently co-pending application is entitled to the benefit of the filing date.

2. For purposes of the USPTO extra-statutory requirements, the present application constitutes a continuation-in-part application of U.S. patent application Ser. No. 12/286,736 entitled AGGREGATION AND RETRIEVAL OF NETWORK SENSOR DATA, naming Edward K.Y. Jung and Clarence T. Tegreene as inventors, filed on 30 Sep., 2008, which is currently co-pending, or is an application of which a currently co-pending application is entitled to the benefit of the filing date.

3. For purposes of the USPTO extra-statutory requirements, the present application constitutes a continuation-in-part application of U.S. patent application Ser. No. 10/909,200 entitled DISCOVERY OF OCCURRENCE-DATA, naming Edward K.Y. Jung and Clarence T. Tegreene as inventors, filed on 30 Jul., 2004, which is currently co-pending, or is an application of which a currently co-pending application is entitled to the benefit of the filing date.

4. For purposes of the USPTO extra-statutory requirements, the present application constitutes a continuation-in-part application of U.S. patent application Ser. No. 10/903,652 entitled DATA STORAGE FOR DISTRIBUTED SENSOR NETWORKS, naming Edward K.Y. Jung and Clarence T. Tegreene as inventors, filed on 30 Jul., 2004, issued as U.S. Pat. No. 7,536,388, which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s). All subject matter of the Related Applications and of any and all parent, grandparent, great-grandparent, etc. applications of the Related Applications is incorporated herein by reference to the extent such subject matter is not inconsistent herewith.

SUMMARY

Systems and processes for detecting and storing occurrence data using mote networks are disclosed. In some embodiments, a system in accordance with the teachings of the present disclosure includes a computing component coupled with a data storage device and operable to receive data from one or more motes, the data representing a feature having a correlation to an occurrence. One or more instructions are loaded on the data storage device that, when executed by the computing component, configure the computing component to receive data from one or more motes into a received data set, receive an input selection corresponding to a target-occurrence having a representative feature, the representative feature including at least one recognizable pattern of at least one parameter in the data received from the one or more of the motes, select a pattern recognition criteria corresponding one of the representative features of the target-occurrence, and in response to the input selection corresponding to the target-occurrence, automatically search the received data set for data correlating to the target-occurrence representative feature using the selected pattern recognition criteria. These and various other features as well as advantages of the present invention will be apparent from a reading of the following detailed description and a review of the associated drawings.

BRIEF DESCRIPTION OF THE DRAWINGS

Aspects of the invention, together with features and advantages thereof, may be understood by making reference to the following description taken in conjunction with the accompanying drawings, in the several figures of which like referenced numerals identify like elements, and wherein:

FIG. 3 illustrates a graph of a hypothetical data related to a sensed parameter that may define an occurrence;

FIG. 4 is a table illustrating several classes of occurrences, a relationship between an individual occurrence and at least one characteristic or attribute of the individual occurrences, and representative features of the individual characteristics;

DETAILED DESCRIPTION

In the following detailed description of exemplary embodiments, reference is made to the accompanying drawings, which form a part hereof. The detailed description and the drawings illustrate specific exemplary embodiments by which the invention may be practiced. Other embodiments may be utilized, and other changes may be made, without departing from the spirit or scope of the present invention.

Throughout the specification and claims, the following terms take the meanings explicitly associated herein unless the context dictates otherwise. The meaning of "a", "an", and "the" include plural references. The meaning of "in" includes "in" and "on."

Figure 1:
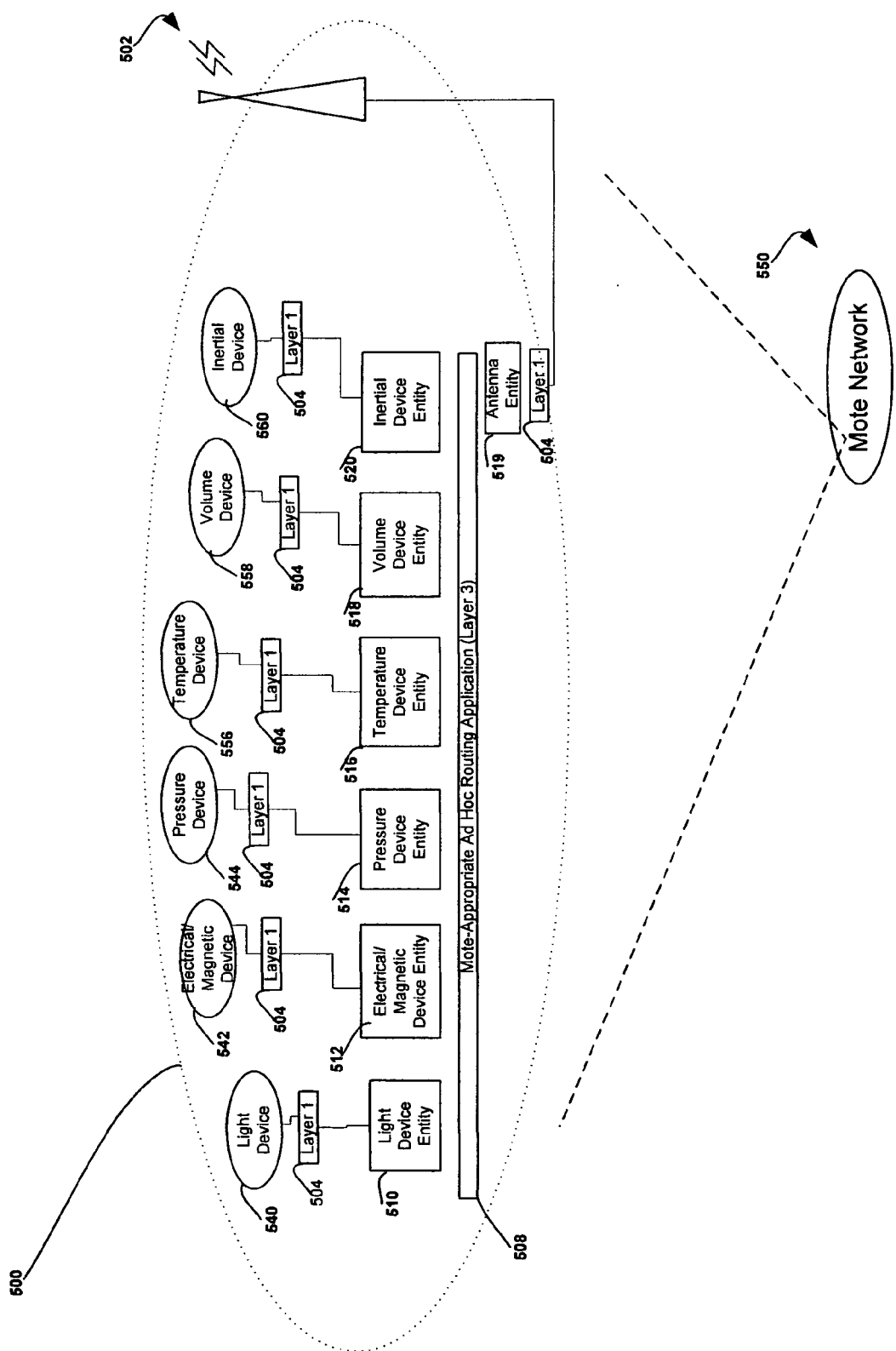
FIGS. 1 and 2 show examples of motes that may serve as a context of one or more processes and/or devices described herein.

With reference now to FIG. 1, shown is an example of mote 500 of mote-appropriate network 550 that may serve as a context for introducing one or more processes and/or devices described herein. A mote is typically composed of sensors, actuators, computational entities, and/or communications entities formulated, in most cases at least in part, from a substrate. As used herein, the term "mote" typically means a semi-autonomous computing, communication, and/or sensing device as described in the mote literature (e.g., Intel Corporation's mote literature), as well as equivalents recognized by those having skill in the art (e.g., Intel Corporation's smart dust projects). Mote 500 depicts a specific example of a more general mote. Mote 500 is illustrated as having antenna 502, physical layer 504, antenna entity 519, network layer 508 (shown for sake of example as a mote-appropriate ad hoc routing application), light device entity 510, electrical/magnetic device entity 512, pressure device entity 514, temperature device entity 516, volume device entity 518, and inertial device entity 520. Light device entity 510, electrical/magnetic device entity 512, pressure device entity 514, temperature device entity 516, volume device entity 518, antenna entity 519, and inertial device entity 520 are depicted to respectively couple through physical layers 504 with light device 540, electrical/magnetic device 542, pressure device 544, temperature device 556, volume device 558, antenna 502, and inertial device 560. Those skilled in the art will appreciate that the herein described entities and/or devices are illustrative, and that other entities and/or devices consistent with the teachings herein may be substituted and/or added.

Those skilled in the art will appreciate that herein the term "device," as used in the context of devices comprising or coupled to a mote, is intended to represent but is not limited to transmitting devices and/or receiving devices dependent on context. For instance, in some exemplary contexts light device 540 is implemented using one or more light transmitters (e.g., coherent light transmission devices or non-coherent light transmission devices) and/or one or more light receivers (e.g., coherent light reception devices or non-coherent light reception devices) and/or one or more supporting devices (e.g., optical filters, hardware, firmware, and/or software). In some exemplary implementations, electrical/magnetic device 542 is implemented using one or more electrical/magnetic transmitters (e.g., electrical/magnetic transmission devices) and/or one or more electrical/magnetic receivers (e.g., electrical/magnetic reception devices) and/or one or more supporting devices (e.g., electrical/magnetic filters, supporting hardware, firmware, and/or software). In some exemplary implementations, pressure device 544 is implemented using one or more pressure transmitters (e.g., pressure transmission devices) and/or one or more pressure receivers (e.g., pressure reception devices) and/or one or more supporting devices (e.g., supporting hardware, firmware, and/or software). In some exemplary implementations, temperature device 556 is implemented using one or more temperature transmitters (e.g., temperature transmission devices) and/or one or more temperature receivers (e.g., temperature reception devices) and/or one or more supporting devices (e.g., supporting hardware, firmware, and/or software). In some exemplary implementations, volume device 558 is implemented using one or more volume transmitters (e.g., gas/liquid transmission devices) and/or one or more volume receivers (e.g., gas/liquid reception devices) and/or one or more supporting devices (e.g., supporting hardware, firmware, and/or software). In some exemplary implementations, inertial device 560 is implemented using one or more inertial transmitters (e.g., inertial force transmission devices) and/or one or more inertial receivers (e.g., inertial force reception devices) and/or one or more supporting devices (e.g., supporting hardware, firmware, and/or software). Those skilled in the art will recognize that although a quasi-stack architecture is utilized herein for clarity of presentation, other architectures may be substituted in light of the teachings herein. In addition, although not expressly shown, those having skill in the art will appreciate that entities and/or functions associated with concepts underlying Open System Interconnection (OSI) layer 2 (data link layers) and OSI layers 4-6 (transport-presentation layers) are present and active to allow/provide communications consistent with the teachings herein. Those having skill in the art will appreciate that these layers are not expressly shown/described herein for sake of clarity.

The inventors point out that in some applications the systems and/or processes transfer their instructions in a piecewise fashion over time, such as is done in the mote-appropriate Mate' virtual machine of the related art. The inventors also point out that in some applications motes are low-power and/or low bandwidth devices, and thus in some implementations the system(s) and process(es) described herein allow many minutes (e.g., hours, days, or even weeks) for herein described agents and/or processes to migrate to and establish themselves at various motes. The same may also hold true for transmission of information among nodes in that in some implementations such transmission may be done over the course of hours, days, or even weeks depending upon bandwidth, power, and/or other constraints. In other implementations, the migrations and/or transmissions are accomplished more rapidly, and in some cases may be accomplished as rapidly as possible.

Figure 2:
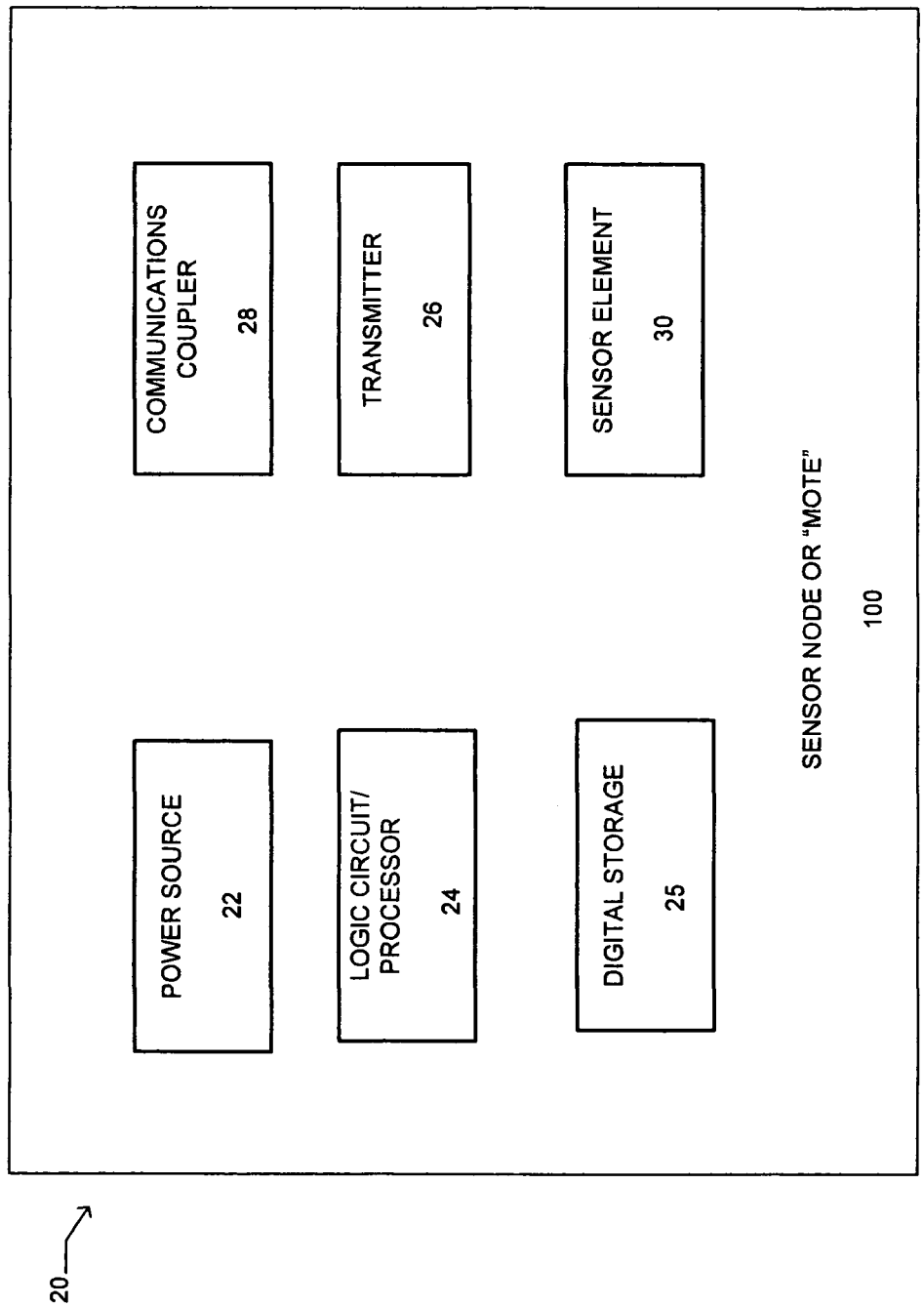

FIG. 2 illustrates a mote 20, many of which can be combined to form a mote network. The mote 20 may be of various sizes, and may be as small as a quarter coin, or smaller, as mote sizes are now in the millimeter range. The mote 20 includes a power source 22, a logic circuit/microprocessor 24, a storage device 25, a transmitter (or transceiver) 26, a communications coupler 28 coupled to the transmitter 26, and a sensor element 30. Alternatively, the mote may be unpowered or passive, drawing its power from a reader or another source.

In the illustrated embodiment, the power source 22 provides power to the mote 20. For example, the power source 22 may include a battery, a solar-powered cell, and/or a continuous power supply furnished by an external power source, such as by connection to a power line. By way of example, the storage device 25 includes any computer readable media, such as volatile and/or nonvolatile media, removable and/or non-removable media, for storing computer data in permanent or semi-permanent form, and can be implemented with any data storage technology. Alternatively, the storage device 25 may store data in a form that can be sampled or otherwise converted into a form storable in a computer readable media.

The transmitter 26 transmits a data signal. In an optional embodiment, the transmitter 26 both receives and transmits data signals (transceiver). A "data signal" includes, for example and without limitation, a current signal, voltage signal, magnetic signal, or optical signal in a format capable of being stored, transferred, combined, compared, or otherwise manipulated. The transmitter 26 may include wireless, wired, infrared, optical, and/or other communications techniques, for communication with a central computing device or central station, and optionally other motes, using the communications coupler 28. The communications coupler 28 may include an antenna for wireless communication, a connection for wired connection, and/or an optical port for optical communication.

The mote 20 may include any type of data processing capacity, such a hardware logic circuit, for example an application specific integrated circuit (ASIC) and a programmable logic, or such as a computing device, for example, a microcomputer or microcontroller that include a programmable microprocessor. The embodiment of the mote 20 illustrated in FIG. 2 includes data-processing capacity provided by the microprocessor 24. The microprocessor 24 may include memory, processing, interface resources, controllers, and counters. The microprocessor 24 also generally includes one or more programs stored in memory to operate the mote 20. If an embodiment uses a hardware logic circuit, the logic circuit generally includes a logical structure that operates the mote 20.

The mote 20 includes one or more sensor elements 30 that are capable of detecting a parameter of an environment in which the sensor node is located and outputting a data signal. The sensor element 30 may detect at least one parameter from a group of optical, acoustic, pressure, temperature, thermal, acceleration, magnetic, biological, chemical, and motion parameters. The optical parameter may include at least one from a group consisting of infrared, visible, and ultraviolet light parameters. For example and without limitation, the sensor element 30 may include a photo sensor to detect a level or change in level of light, a temperature sensor to detect temperature, an audio sensor to detect sound, and/or a motion sensor to detect movement. The sensor element 30 may include a digital image capture device, such as for example and without limitation, a CCD or CMOS imager that captures data related to infrared, visible, and/or ultraviolet light images.

Typically, the mote 20 automatically acquires data related to a parameter of the sensor node environment, and transmits data to a central computing device. For example, the sensor element 30 in a form of an acoustic sensor may acquire sound levels and frequencies, and transmit the data related to the levels and frequencies along with a time track using the transmitter 26 and the communication coupler 28. The acquisition may be on any basis, such as continuously, intermittently, sporadically, occasionally, and upon request. In an alternative embodiment, the time track may be provided elsewhere, such as a device that receives the sensor data.

By way of further example and without limitation, the sensor element 30 in a form of an optical digital camera may periodically acquire visual images, such as for example, once each second, and to transmit the data related to visual images along with a time track. In another example, the sensor element 30 in the form of a temperature sensor may detect temperature changes in two-degree temperature intervals, and to transmit each two-degree temperature change along with the time it occurred. Each of the above examples illustrates a sequence, ranging from continuous for acoustical detection to a per occurrence basis for two-degree temperature changes.

The sensor element 30 may sense operational parameters of the mote 20 itself, such as its battery/power level, or its radio signal strength. Sensor data, including a data related to a sensed parameter, is transmitted from the mote 20 in any signal form via the transmitter 26 and the communications coupler 28, to a receiver. The receiver may be, for example, another mote 20, a central computing device, or any other data receiver. The sensor data may include a time and/or date that the data related to a parameter was acquired.

The mote 20 may include a unique identifier, and is operable to communicate the identifier in an association with its sensed parameter. In an alternative embodiment, the mote 20 may include a configuration that determines its location, for example, by a GPS system, by triangulation relative to a known point, or by communication with other motes. Alternatively, the location of the mote 20 may be a known parameter established previously. Similarly, location identification may be associated with data originated and/or forwarded by the mote.

FIG. 3 illustrates a graph 50 of a hypothetical chronological sequence 52 of a sensed parameter that may define an occurrence. The sequence 52 illustrates a chronological sequence of a parameter that might be outputted by a sensor node, and is plotted on the graph 50 with time on a x-axis and amplitude on a y-axis. The sinusoidal sequence 52 includes several representative features. A first representative feature is that the sequence 52 includes only two frequencies, A and B. A second representative feature is that each frequency lasts for three cycles before the sequence 52 changes to the other frequency. A third representative feature is that the sequence 52 amplitude is generally the same over the time T.

For example, assume that an individual user is seeking data representative of a car accident. The car accident is the target-occurrence. Further, assume that a characteristic of a car accident is that an emergency vehicle may approach and/or be present at the scene with its siren activated. Further, assume that it is known that a "do-dah, do-dah, do-dah" type siren used by some emergency vehicles, such as fire, ambulance, or police, generates sound or acoustic waves that include the three features of the sequence 52. Also, assume that the sequence 52 represents a chronological sequence output parameter by an acoustic sensor, such as element 30 of the mote 20 of FIG. 2. Application of a pattern recognition criteria that recognizes the three above representative features of a sensor data that includes the sequence 52 is likely to locate sensor data representative of the car accident occurrence that involved a presence of siren. The sensor data may be either from a single mote 20 or a plurality of motes 20.

By way of further example, if the occurrence of interest is passage of an emergency vehicle siren through an intersection monitored by an acoustic sensor, a fourth representative feature would be a Doppler shift in the frequencies A and B on the passage of the vehicle. Expansion of the pattern recognition criteria to include recognition of the fourth feature is likely to locate sensor data representative of the passage of the emergency vehicle. This example may be expanded where each intersection in a portion of a city is individually monitored by networked, distributed acoustic motes. Application of the expanded pattern recognition criteria to the chronological sequences of acoustic data outputted by the motes is expected to locate data representative of the passage of the emergency vehicle through each intersection, including a time of passage. Note that in this example, the siren is a selected target-occurrence while in the above example, the siren is a characteristic of the selected target-occurrence, the car accident.

An occurrence includes anything that may be of interest, for example, to a user, a computing device, or machine. An occurrence may be or include, for example, a reference, an incident, an accident, an event, a real world event, a change in a data sequence, and a change in a time domain. An occurrence may be a high-level matter such as a car crash or a riot, or a lesser-level matter, such as a siren or gun shot. This detailed description uses certain events having a sequence of at least one parameter that may be detected by a sensor element to describe embodiments. However, the invention is not so limited.

FIG. 4 is a table illustrating several classes of occurrences, a relationship between an individual occurrence and at least one characteristic or attribute of the individual occurrences, and representative features of the individual characteristics. Table of FIG. 4 illustrates an anticipated relationship between occurrences, characteristics, and features.

For example, occurrence 1 of FIG. 4 is a car crash. A car crash includes a plurality of characteristics or attributes, such as (a) breaking glass, (b) impact noise, (c) tire screech, and (d) approach and presence of emergency vehicles. Each of these characteristics has representative features that can be sensed by one or more motes, such as the mote 20. Characteristic or attribute (a), breaking glass of occurrence 1, a car crash, is expected to include a representative feature of sequential, high, and broadly distributed sound frequencies that would be sensed by an acoustic sensor, such as the sensor element 30 of FIG. 2. Characteristic (d), approach and presence of emergency vehicles, is expected to include a representative feature of a siren being sounded as an emergency vehicle approaches a car accident scene. A more detailed example of representative features of a "do-dah, do-dah" siren pattern is described in conjunction with FIG. 3 above. Other types of emergency sirens are expected to have different representative features.

By way of further example, a siren sound, which is a characteristic of occurrence 1, may also be considered an occurrence, and is shown as occurrence 2 of FIG. 4. FIG. 4 also includes examples of fire, armored convey passage, and physical assault as high-level occurrences, and a gun shot as a lesser-level occurrence.

As described above, each occurrence has certain known and/or discoverable features or representative features. In FIG. 3, the graph 50 of the hypothetical chronological sequence 52 of a sensed parameter illustrates three representative features that may correspond to an occurrence.

One or more representative features are selected for recognition of sensor data representative of an occurrence of interest, which is also referred to as a target-occurrence. Representative features are features that correspond to a characteristic of an occurrence and provide a data representation of the occurrence. A representative feature may be individually selected by an input-selector, or automatically selected. Any suitable pattern recognition criteria, such as which may be expressed in an algorithm, method and/or device, is used to identify one or more of the selected representative features of a target-occurrence for identification, location, retention, and/or retrieval of sensor data corresponding to the target-occurrence. In certain embodiments, the pattern recognition criteria are computer implemented. "Pattern recognition criteria" as used in this specification may include anything that recognizes, identifies, or establishes a correspondence with, one or more representative features of an occurrence. While the fields of pattern recognition and artificial intelligence are sometimes considered as separate fields, or that one is a subfield of the other, pattern recognition as used herein may include methods and/or devices sometimes described as artificial intelligence. Further, pattern recognition may include data or image processing and vision using fuzzy logic, artificial neural networks, genetic algorithms, rough sets, and wavelets. Further, a determination of which features are representative features of a target-occurrence may also be determined using pattern recognition.

Figure 5:
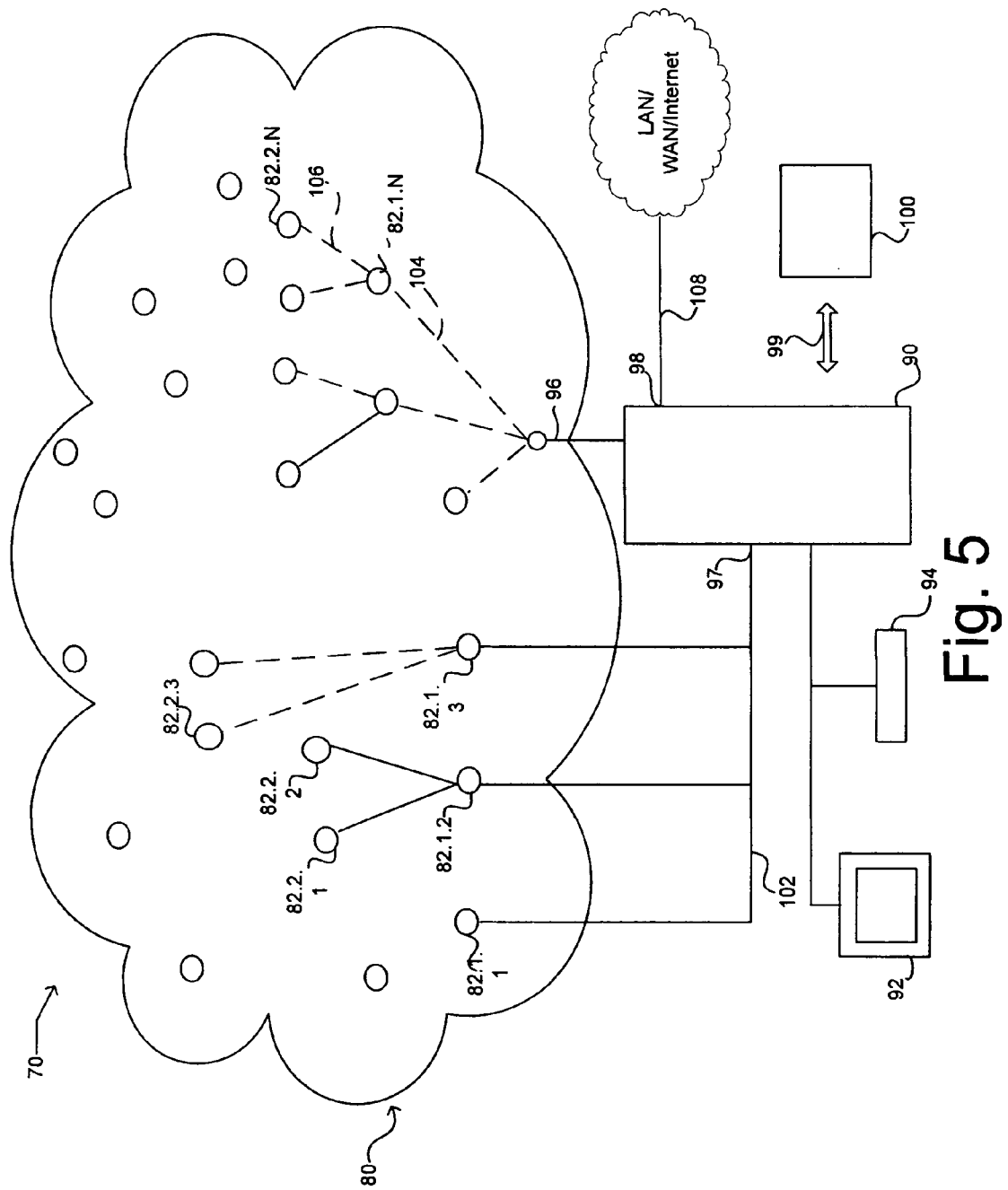
FIG. 5 illustrates a distributed sensor network.

FIG. 5 illustrates a distributed mote network 70 that includes an array of motes 80, a central computing device 90, at least one digital storage device, illustrated as a digital storage device 100, and a plurality of communications links. The motes of the plurality of motes 80 may be similar to the mote 20 of FIG. 2. For purposes of illustration, the motes are given reference numbers indicative of their communications tier with respect to the central computing device 90. The first tier has reference numbers 82.1.1-82.1.N, and the second tier has reference numbers 82.2.1-82.2.N. Additional tiers are not numbered for clarity. Each mote in the array of motes 80 may sense a same parameter. Alternatively, a plurality motes of the array of motes 80 may respectively sense different parameters. For example, the mote 82.1.1 may respectively sense acoustical pressure and mote 82.1.2 may respectively sense temperature. The respective parameters sensed by the individual motes may be mixed and matched in any manner to provide a desired parameter description of the area in which the array of motes 80 are deployed.

In an embodiment, the individual motes of the plurality of motes 80 of the mote network 70 are typically distributed, that is they are physically separated from each other. However, in certain embodiments, sensor nodes that sense different parameters are grouped in proximity to provide a more complete data related to a location. Further, in an embodiment, the motes of the array of motes 80 are distributed over a geographical area. Such distributed motes may include sensing "real world" environmental parameters occurring in a locale of each sensor, for example and without limitation, weather, car crashes, and gunshots. In another embodiment, the motes of the array of motes 80 are distributed in a manner to sense a parameter related to a physical entity, such as, for example and without limitation, individual pieces of a distributed equipment, such as traffic lights or cell-phone transmission towers, or a locale, such as seats in a stadium.

An exemplary system implementing an embodiment includes a computing device, illustrated in FIG. 5 as a central computing device 90. In its most basic configuration, the computing device 90 typically includes at least one central processing unit, storage, memory, and at least some form of computer-readable media. Computer readable media can be any available media that can be accessed by the computing device 90. By way of example, and not limitation, computer-readable media might comprise computer storage media and communication media.

Computer storage media includes volatile and nonvolatile, removable and non-removable media implemented in any method or technology for storage of data such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired data and that can be accessed by the computing system 90. The computer storage media may be contained within a case or housing of the computing device 90, or may be external thereto.

Communication media typically embodies computer-readable instructions, data structures, program modules or other data in a modulated data signal such as a carrier wave or other transport mechanism and includes any information and/or delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. Combinations of any of the above should also be included within the scope of computer-readable media. Computer-readable media may also be referred to as computer program product.

The digital storage device 100 may be any form of a computer data digital storage device that includes a computer storage media, including the forms of computer storage media described above. The digital storage device 100 may be a local digital storage device contained within a case housing the computing device 90. Alternatively, the digital storage device 100 may be a local and external digital storage device proximate to the computing device 90, or remote to the computing device, and that coupled to the computing device 90 in either case by a communications link 99.

The computing device 90 also includes communications ports that allow the computing device to communicate with other devices. More specifically, the computing device 90 includes a port 97 for a wired communication link, such as the wired communication link 102 providing communications with at least one mote of the array of motes 80. The computing device 90 also includes a wireless transceiver or receiver coupled with a communications coupler, such as the antenna 96, for wireless communication over a link, such as the wireless communication link 104. The wireless communications link 104 provides wireless communications with at least one mote of the array of sensors devices 80. The wireless communication link 104 may include an acoustic, radio frequency, infrared and/or other wireless communication link. The computing device 90 further includes a port 98 for wired, wireless, and/or optical communication over a communication link 108 with a network, such as a local area network, wide area network, and Internet. Such networking environments are commonplace in offices, enterprise-wide computer networks, intranets and the Internet. The communications link may include an acoustic, radio frequency, infrared and other wireless connection.

The computing device 90 may also have input device(s) 94, such as keyboard, mouse, pen, voice input device, touch input device, etc. The computing device 90 may further have output device(s) 92, such as a display, speakers, printer, etc. may also be included. Additionally, the computing device 90 may also have additional features and/or functionality.

The computing device 90 may be implemented in any suitable physical form, including a mainframe computer, a desktop personal computer, a laptop personal computer, and a reduced-profile portable computing device, such as a PDA or other handheld device.

Logical operation of certain embodiments may be implemented as a sequence of computer implemented steps, instructions, or program modules running on a computing system and/or as interconnected machine logic circuits or circuit modules within the computing system. The implementation is a matter of choice dependent on the performance requirements of the computing system implementing and embodiment. In light of this disclosure, it will be recognized by one skilled in the art that the functions and operation of various embodiments disclosed may be implemented in software, in firmware, in special purpose digital logic, or any combination thereof without deviating from the spirit or scope of the present invention.

Figure 6:
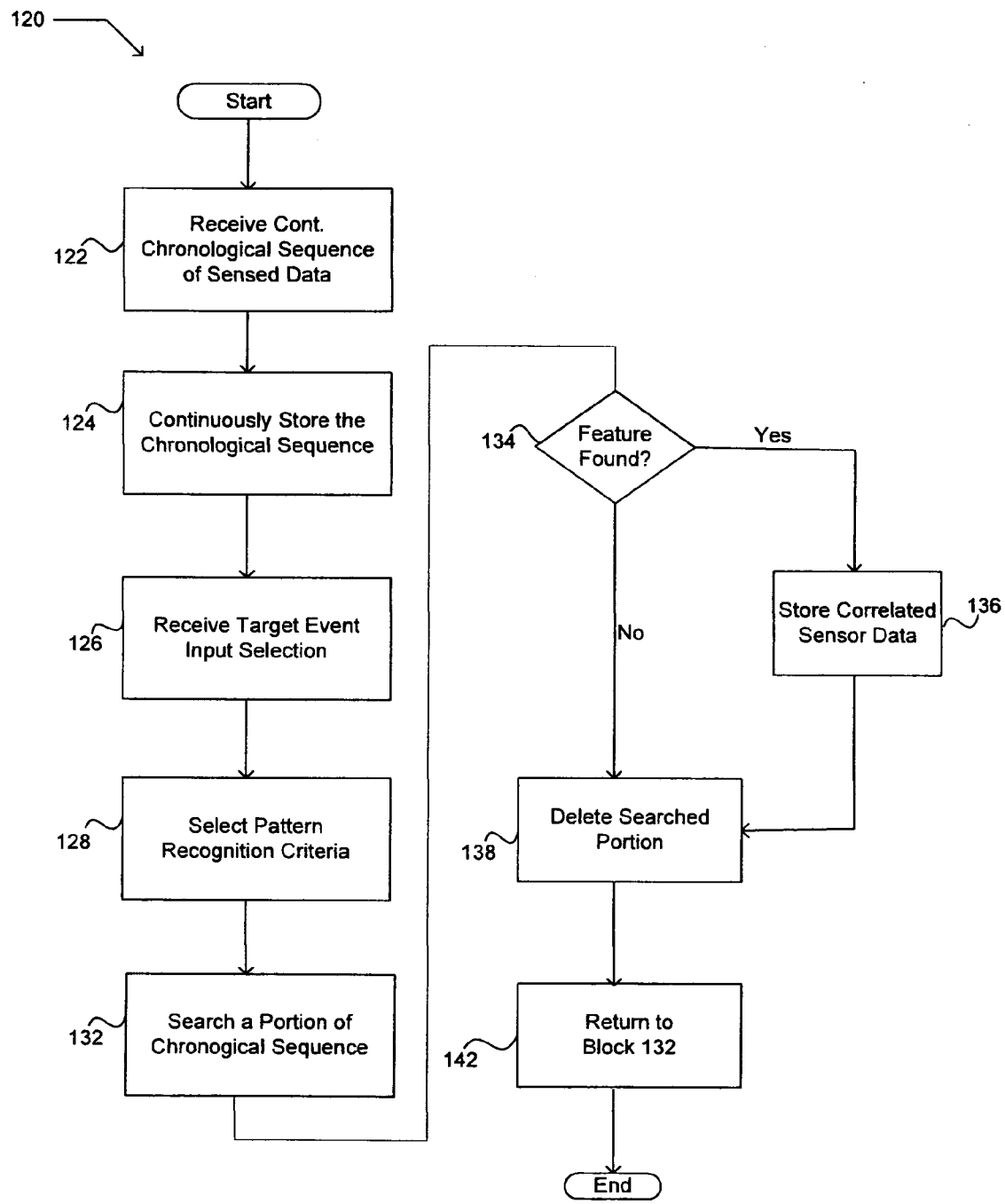
FIG. 6 shows a flow diagram illustrating an exemplary process in which sensor data correlating to a target-occurrence is acquired from a sensor network and stored.

FIG. 6 shows a flow diagram illustrating an exemplary process 120 in which sensor data correlating to a target-event is acquired from a sensor network and stored. In certain embodiments, the process 120 is implemented in a central computer, such as the computing device 90 of FIG. 5. In other embodiments, at least a portion of the process 120 is implemented in a sensor node of an array of motes, such as the mote array 80 of FIG. 5.

After a start block, the process 120 moves to block 122. At block, 122, a computing device, such as the central computing device 90, continuously receives sensed data of at least one parameter from a mote over a communications link. The mote may be any mote, such as the mote 82.1.2, 82.1.N, or 82.2.2 of the array of motes 80 of FIG. 5. The communications link may be any communications link known in the art, for example and without limitation, an optical, a wireless, and/or a wired link. For example, FIG. 5 illustrates the mote 82.1.2 communicating over the wired communications link 102, and the mote 82.1.N communicating over the wireless communications link 104. FIG. 5 also illustrates the mote 82.2.2 communicating over a wireless link 106 with the mote 82.1.3, which then relays and communicates the data from the mote 82.2.2 with the computing device 90 over the wired communications link 102.

Optimally, the sensed data is transmitted at intervals and aggregated into the data related to the sensed at least one parameter by a receiving device. In an alternative embodiment, the sensed data may be transmitted continuously by the mote. Furthermore, in another embodiment, the sensed data may include continuously sampled data at a predetermined sampling rate, such as a temperature reading captured during the first minute of every five-minute interval, or such as a digital image captured once each second.

With continued reference to FIG. 6, at block 124, the received sensed data is continuously stored in a storage device, such as the storage device 100, as first sensor data set. In an alternative embodiment, the first data set includes a multi-element data structure from which elements of the data related to the sensed at least one parameter can be removed only in the same order in which they were inserted into the data structure. In another alternative embodiment, the first data set includes a multi-element data structure from which elements can be removed based on factors other than order of insertion.

At block 126, an input selection is received from an input-selector of a target-event having at least one representative feature. In a certain embodiment, the input-selector includes a user, who inputs the selection of the target-event using the user input device 94 of FIG. 5. The user may select the target-event from a list of possible target-events displayed on the user output device 92. The list for example, may be similar to the list of occurrences of FIG. 4. In other embodiments, the input-selector includes a machine, or a program running on a computing device, such as the computing device 90.

In an embodiment, the input selection of the target-event may include a selection an event that is directly of interest. For example, a sound pattern of interest, such as the siren sound that is event 2 of FIG. 4. In another embodiment, the input selection of the target-event may be formulated in terms of a parameter that correlates to the event that is directly of interest. For example, where the event of interest is a fire, the input may be formulated in terms of a siren sound indicating an approach or presence of emergency vehicles. The siren sound is characteristic (a) of a fire, which is event 3 of FIG. 4.

In a further embodiment, the input selection of the target-event is formulated in terms of weighing and/or comparing several instances of a sensed data of at least one parameter from a plurality of motes to determine which of the several instances provide a good representation of the target-event. For example, the input selection may request the best sensed data from six sensor, such as the best sensed data from six sensors that heard a gun shot during a time period.

As further shown in FIG. 6, at block 128, a pattern recognition criteria corresponding to at least one representative feature of the target-event is selected. In an embodiment, the method includes at least one representative feature of each possible target-event. The process automatically selects one or more pattern recognition criteria for recognition of sensor data representative of or corresponding to the target-event. In certain embodiments, the pattern recognition criteria are included with the process 120, or available to the process from another source. For example, pattern recognition criteria may be associated locally with the computing device 90, or available to it over a communications link, such as the communications link 108. In a further embodiment, pattern recognition criteria are provided to the computing device by the input-selector in conjunction with the input of selection of the target-event.

At block 132, in response to the input selection corresponding to the target-event, the first sensor data set is automatically searched for data correlating to the at least one target-event representative feature using the selected pattern recognition criteria.

In a certain embodiment, the received input selection of the target-event further includes a selection of a representative feature of the target-event. The inputted selection of a target-event representative feature may be any feature that the input-selector chooses for searching sensor data. For example, the selected representative feature may include a time period and acoustic frequency components. The acoustic frequency components may include a selected frequency pattern, such as a recognized word, set of words, breaking glass, dog bark, door opening, alarm, threshold acoustic level, and voiceprint. The selected representative feature may include a selected electromagnetic pattern, such as a visible light, infrared light, ultraviolet light, and radar. In this embodiment, at block 128, a pattern recognition criteria is automatically selected by instructions in response to the selected representative feature. Further, at block 132, the first sensor data set is automatically searched using the pattern recognition criteria selected in response to the inputted representative feature.

At decision block 134, a determination is made if sensor data correlating to the at least one target-event representative feature was found. If the sensor data is not found, the process branches to block 138. If the sensor data is found, the process branches to block 136. At block 136, the instructions cause the computing device 90 to store the correlated sensor data in a retained data storage. The retained data storage may be at any location. For example and without limitation, the retained data storage may be local to the central computing device 90, such its removable or non-removable media; it may included in the digital storage device 100; or it may be a remote digital storage device associated with the computing device 90 over a communications link, such as the communications link 108. In an embodiment, access to the retained data storage is restricted to authorized users. After storage of the correlated sensor data in a retained data storage, the process moves to block 138.

In certain embodiments, in addition to storing the sensor data correlating to at least one target-event representative feature, the process includes storing a portion of the sensor data that was sensed before the found target-event representative feature. In other embodiments, the instructions include storing a portion of the sensor data that was sensed after the found target-event representative feature. In still other embodiments, the instructions include storing a portion of the sensor data that was sensed both before and after the found target-event representative feature. These embodiments allow data occurring before and/or after the representative features to be saved.

In another embodiment, the process includes assigning a tentative event-identifier to the correlated sensor data. For example, if the target-event is a fire, and if a search of the first data set for data correlating to at least one fire event representative feature finds correlating sensor data, the process includes association of a tentative event-identifier, such as "fire," with the correlated sensor data. The trial-event identifier is associated with the stored correlated sensor data at block 136.

At block 138 (FIG. 6), the data related to the sensed at least one parameter is continuously deleted from the first data set according to a deletion sequence. In an embodiment, the deletion sequence includes a substantially first-in, first-out order. In another embodiment, the deletion sequence includes a factor other than order of insertion into the data set.

At block 142, the process returns to block 132 to search another portion of the continuously received sensed data. The process continues while the continuous sensed data is received. The instructions then move to the stop block.

An embodiment provides a computer implemented process for searching the data related to the sensed at least one parameter from the first data set and storing correlated sensor data for both the target-event as described above and another target-event before deletion of the data from the first data set. In an alternative embodiment, another input selection is received corresponding to another target-event having at least one representative event feature. The input selection is received in a manner substantially similar to block 126. In a manner substantially similar to block 128, another pattern recognition criteria is automatically selected corresponding to at least one of the representative features of the selected another target-event.

In a manner substantially similar to block 132, in response to the input selection corresponding to the another target-event, the first sensor data set is automatically searched for data correlating to the at least one target-event feature of the another target-event using the selected pattern recognition criteria. In a manner substantially similar to decision block 134, if sensor data correlating to the at least one target-event representative feature of the another target-event is found, the correlated sensor data is stored in the same retained data storage used to store representative features of the first target-event, or another retained data storage.

A further embodiment includes substantially simultaneously storing correlated sensor data for the target-event from two motes, each node generating separate data related to a same or a different sensed parameter. In such an embodiment, two parallel instances of sensed parameters are searched by the computing device 90 of FIG. 4 for data correlating to at least one representative feature of the target-event. In a manner substantially similar to block 122, data related to a sensed parameter from a second mote of the plurality of distributed motes is continuously stored into a second sensor data set.

In a manner substantially similar to block 132, in response to the input selection corresponding to the target-event, the second sensor data set is automatically searched for data correlating to the at least one target-event representative feature using the selected pattern recognition criteria. In a manner substantially similar to decision block 134, if sensor data correlating to the at least one target-event representative feature of the target-event is found in the second data set, the second correlated sensor data is stored. The storage location may be the same retained data storage used to store representative features of the first target-event, or another retained data storage.

Yet another embodiment provides a process that substantially simultaneously stores correlated sensor data for a plurality of target-events from a respective plurality of motes, each node generating a separate data related to a same or a different sensed parameter. The manner and method of scaling the computer process 120 for the parallel and substantially simultaneous storing of correlated sensor data may be done in any manner known to those in the art.

Another embodiment includes using the computing power and storage of a mote, such as the mote 20 of FIG. 2, to run at least a portion of the process 120. In conjunction with block 126 of FIG. 6A, the target even input selection may be preloaded into the mote, or may be communicated to the mote over a communications link. Similarly, in conjunction with block 128, the pattern recognition criteria may also be preloaded into the mote, or may be communicated to the mote over a communications link. At block 136, the retained data storage that stores the correlated sensor data may be local to the mote, such as the digital storage 25 of FIG. 2. The process 120 includes the mote transmitting at least a portion of the stored correlated sensor data over a communications link to a central computing device, such as the central computing device 90 of FIG. 5. The process 120 may further include deleting the stored sensor data after the data has been communicated to the central computing device. In an alternative embodiment, the process 120 includes the mote transmitting the stored correlated sensor data to the central computing device in response to a pull by the central computing device. In another alternative embodiment, the process 120 includes the mote pushing the stored correlated sensor data to the central computing device.

Alternatively, at block 136, the retained data storage may be the digital storage device 100 of the central computing device 90 of FIG. 5. The process 120 may include instructions that cause the mote to transmit at least a portion of the found correlated sensor data to the digital storage device 100 for an initial storage.

An embodiment includes a communication media embodying the process 120, which, when implemented in a computer, causes the computer to perform a method. For example, in an embodiment where the process 120 is implemented in a computing device, such as the computing device 90 of FIG. 5, instructions embodying the process are typically stored in a computer readable media, such as without limitation the storage media and memory of the computing device, and loaded into memory for use.

A further embodiment includes a method implementing the steps of the computerized process 120, and a computer readable carrier containing instructions which, when implemented in a computer, cause the computer to perform the method of the computer process 120.

An exemplary system employing certain embodiments described above may be illustrated by a network system of distributed acoustic motes placed on a plurality of city traffic lights. While the illustrative system describes the networked system as owned by the city maintaining the traffic lights, the exemplary system may have any ownership, such as a private, public, and governmental, and may be used for any purpose, such as private, public, governmental, and military.

The exemplary system includes an orientation toward gathering and storing acoustic event data for later identification and retrieval. The individual motes may use the power supplied to the traffic light as their power source, or alternatively, use long-life batteries or solar power. The individual motes may communicate with a central computing device by sending sensor data over the power lines serving the traffic light, separate wire communication links, or wireless communications links. An event-data storage program embodying certain embodiments described above is operating on the central computing device. Depending on the city's need to accumulate sensor data and total digital data storage space requirements, a digital storage device within the central computing device case may be used, or at least one local larger capacity device proximate to the central computing device may be used.

In operation of the exemplary system, each mote transmits data related to sensed acoustic data generated by their acoustic sensor element to the central computing device. While the sensed acoustic data may be transmitted continuously by each mote, optimally in this embodiment to conserve bandwidth, the data is temporarily stored in the mote and transmitted to the central computing device in batches. A portion of sensed acoustic data for each mote in the network, including an identification of the originating mote, is received by the event-data storage program operating on the central computing device and stored in a data set queue in the associated digital storage device. Optimally, the sensed acoustic data for each mote is stored in a separate data set queue. This illustrative system contemplates that two things occur before the sensed acoustic data is received. First, the event-data storage program receive at least one target-event input selection. Second, a pattern recognition criteria corresponding to at least one of the representative features of the target-event be selected. For this exemplary system, the selected target-events are a gunshot, siren, tire screech, and loud voices. The event-data storage program automatically searches each sensor data set for senor data having representative features correlating to a gunshot, siren, tire screech, or loud voices using the selected pattern recognition criteria. If sensor data correlating to a representative feature of a gunshot, siren, tire screech, and loud voices is found, the program stores the correlated sensor data in a retained data storage. The retained data storage may have sufficient capacity to archive correlated event-data for a predetermined time period, such as a week, a month, a year, or multiple years.

Optimally, the program also associates and stores a tentative event-identifier, such as gunshot, siren, tire screech, or loud voices, with the correlated sensor data. The associated tentative event-identifier will allow city officials to search the correlated sensor data by identifying and event from gunshot, siren, tire screech, or loud voices, and searching the retained data storage by tentative identifiers instead of what may be a more complicated search use pattern recognition criteria. After the batch sensed acoustic data is searched, the program automatically deletes the sensor acoustic data from the data set queue. The deletion minimizes the amount of digital data storage necessary in the system by saving only sensor data correlating to selected target-events.

While the above exemplary system includes gathering and storing event-data on a non-real-time basis for later retrieval, an embodiment allows the system to perform real-time tentative identification of one or more target-events and save correlating sensor data. For example, motes having sufficient computing capacity may be preloaded with one or more input target-event selections. Each mote would automatically and in substantially real-time search sensor data generated by its local sensor element for sensor data correlating to the input target-event selection. Instead of storing for later transmission, the found correlating sensor data would be immediately transmitted to the central computing device and be available for use. The data transmission may include associated tentative event-identifiers. In effect, the motes filter their acoustical data and only provide sensor data to the central computing device that corresponds the inputted target-event selection. The event-data program may then store the found correlating sensor data, and notify a user in substantially real-time of receipt of data having the tentative target identifiers. The notification may be by a display on a monitor screen coupled with the central computing device. The user may then listen to the correlated sensor data and take appropriate action, such as notifying police or fire.

Another embodiment includes a mobile central computing device that a user takes into communication range with a network of remote motes. A mobile computing device, such as a laptop and a reduced-profile computing device, provide mobility to the computing device 90. The mobility allows a user to take the central computing device 90 into the field and within transmission range of certain motes of a distributed network of remote sensor nodes. The motes typically have acquired and stored a plurality of sensor data sets, each sensor data set representing a respective feature sensed by a sensor element of its respective mote. A communication link, typically a wireless link, is established between the computing device 90 and one or more of the motes of the array of motes 80 of the network of remote or distributed motes 70. The user inputs a selection of sensor data sets to be transmitted from the certain motes to the computing device 90. In response, a process running on the computing device 90 communicates with the one or more motes, extracts the sensor data sets, stores them, and provides a confirmation to the user that the selected sensor data sets have been received. The user typically will receive the confirmation and move the computing device into communication proximity to other motes of the array of motes 80. Typically, the stored plurality of sensor data sets are deleted from the motes after transmission to the computing device 90 to free-up storage.

Figure 7:
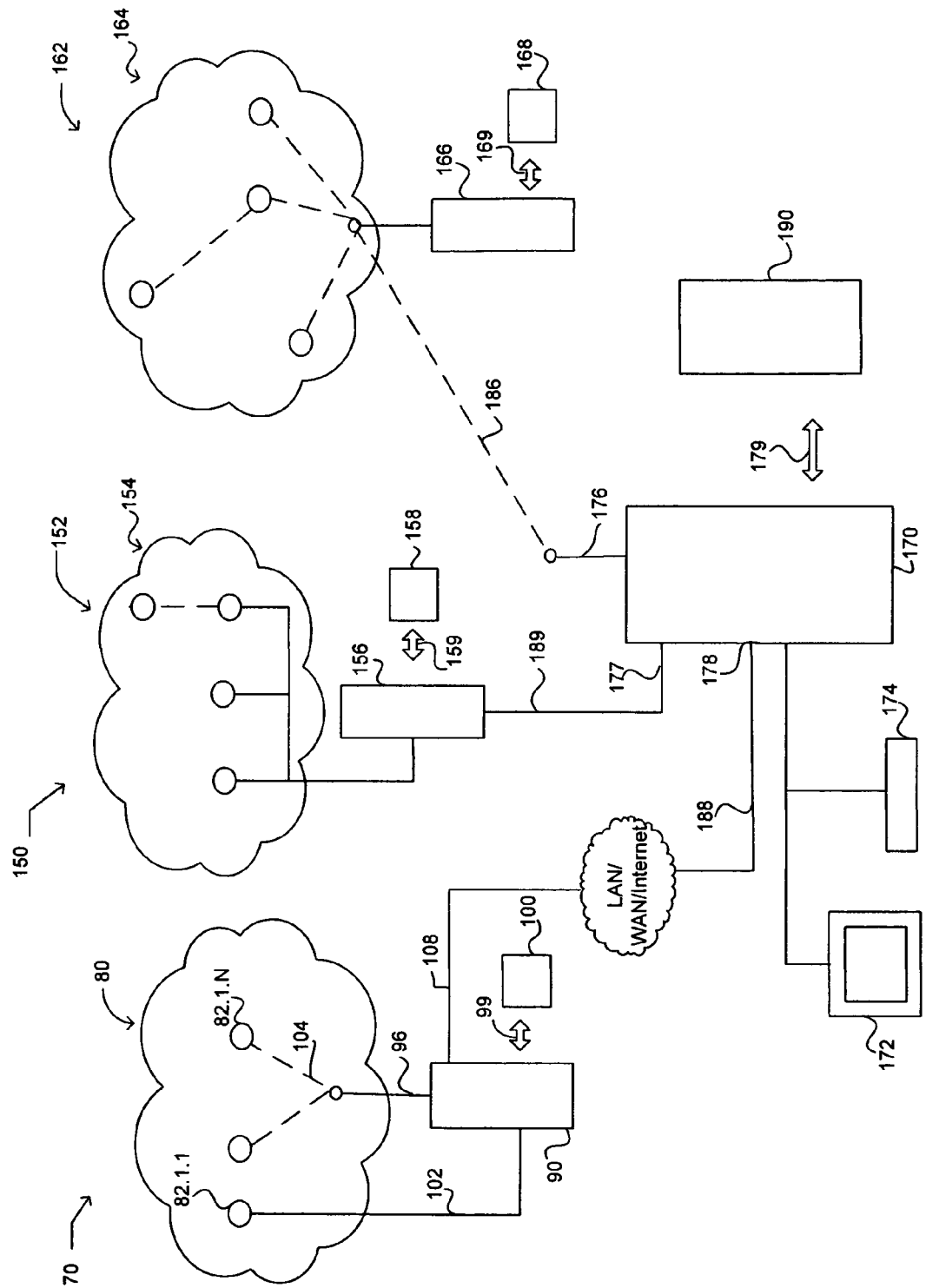
FIG. 7 illustrates a distributed sensor node occurrence-data archival and retrieval system.

FIG. 7 illustrates a distributed mote event-data archival and retrieval system 150. The system 150 includes a plurality of distributed mote networks, illustrated as first, second, and third distributed mote 70, 152, and 162 respectively. The distributed mote network 70 is described in conjunction with FIG. 5, and the mote networks 152 and 162 are substantially similar to the mote network 70. Each distributed mote network includes an array of motes, illustrated as a first, second, and third arrays 80, 154, and 164 respectively. Each mote network also includes at least one central computing device, illustrated as first, second, and third central computing devices 90, 156, and 166 respectively, and includes a plurality of communications links. The arrays of motes 154 and 164 are substantially similar to the array of motes 80 described in conjunction with FIG. 5. For clarity, only several motes and their communications links are illustrated in the arrays 80, 154, and 156 in FIG. 7.

The second and third central computing devices 156 and 166 are substantially similar to the first central computing device 90 of FIG. 5. The second and third digital data storage devices 158 and 168, and the associated communications links 159 and 169 that communicate with those central computing devices are substantially similar to the first digital data storage device 100 and the first communications link 99, also as described in conjunction with FIG. 5.

The system 150 also includes an aggregating computing device 170 that is substantially similar to the central computing device 90 of FIG. 5. The words "central," "aggregating," "collecting," and "archival" are used in this specification, including the claims, to identify certain devices and to illustrate a possible network hierarchy environment of one or more embodiments. These words do not limit the nature or functionality of a device. The system 150 illustrates a possible network hierarchy where, in an embodiment, a plurality of central computing devices, illustrated as the central computing devices 90, 156, and 166, receive and store mote data from a plurality of mote arrays, illustrated as the motes of the arrays 80, 154, and 164 respectively. The system 150 also illustrates a possible network hierarchy where, in an embodiment, the aggregating computing device 170 receives and stores, i.e., aggregates, sensor data acquired by a plurality of central computing devices, illustrated in FIG. 7 as central computing devices 90, 156, and 166. In another embodiment, the computing device 170 may function as a central computing device providing sensor data it received and stored to another aggregating computing device (not illustrated).

The computing device 170 communicates with at least one remote digital data storage device, such as storage devices 100, 158, and 168, through their associated computing devices 90, 156, and 166, respectively, using one or more communications links. As illustrated in FIG. 6, the aggregating computing device 170 also includes communications ports that allow the computing device to communicate with other devices. These communications ports are substantially similar to the communications ports of the computing device 90 of FIG. 5. More specifically, the computing device 170 includes a sensor communication port 177 for a wired communication link, such as the wire communication link 189, providing communications with the central computing device 156 and its associated digital data storage device 158. The computing device 170 also includes a wireless transceiver or receiver coupled with a communications coupler, such as an antenna 176, for wireless communication over a communications link, such as a wireless communication link 186. FIG. 7 illustrates the wireless communication link 186 coupling the computing device 170 and the computing device 166, and its associated digital data storage device 168. The computing device 170 further includes a network communications port 178 for wired, wireless, and/or optical communication over a communication link, such as the network communications link 188, for communication with a network, such as a local area network, wide area network, and Internet. FIG. 7 also illustrates a communications link 188 as network link between the central computing device 90 and its associated digital storage device 99. The communications link 188 may include an acoustic, radio frequency, infrared and other wireless connection.

The system 150 also includes at least one digital storage device as an event-data archive, illustrated as an archival digital data storage device 190, which may be substantially similar to the digital data storage device 100 of FIG. 5. The archival digital storage device 190 may be a local digital data storage device contained within a case housing the computing device 170. Alternatively, the archival digital storage device 190 may be a local and external digital data storage device proximate to the computing device 170, or it may be remote to the computing device. The archival digital data storage device 190 is coupled to the computing device in any event by a communications link 179.

The aggregating computing device 170 may also have input device(s) 174, such as keyboard, mouse, pen, voice input device, touch input device, etc. The computing device 170 may further have output device(s) 172, such as a display, speakers, printer, etc. may also be included. Additionally, the computing device 170 may also have additional features and/or functionality.

Figure 8:
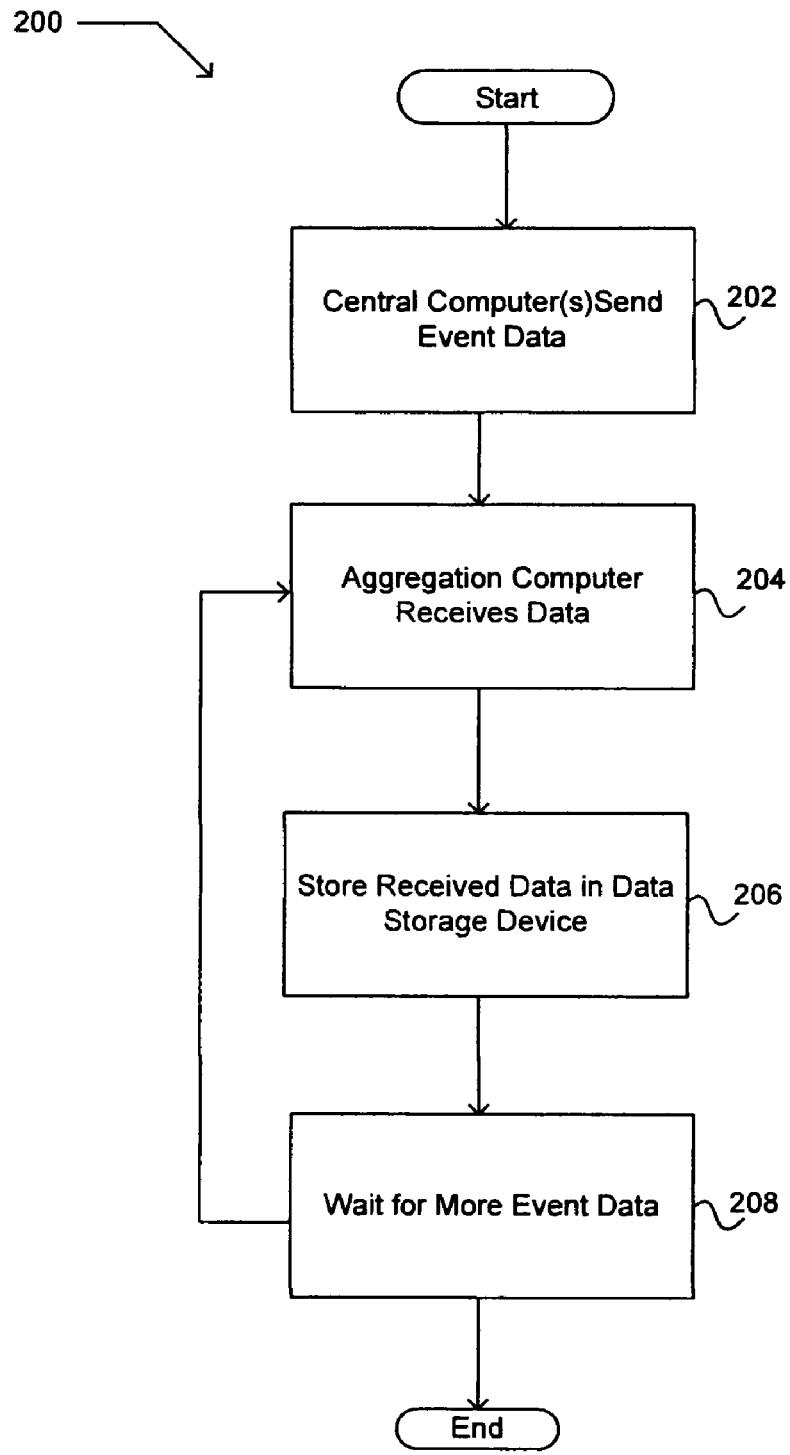
FIG. 8 is a flow diagram illustrating an exemplary process that aggregates and stores a plurality of instances of correlated sensor data in an occurrence-data archive.

FIG. 8 is a flow diagram illustrating an exemplary process 200 that aggregates and stores a plurality of instances of correlated sensor data in an event-data archive. After a start block, the process 200 moves to block 202. At block, 202, a plurality of central computing devices, such as the central computing devices 90, 156, and 166, each transmit a plurality of instances of correlated sensor data to an aggregating computing device. The instances of correlated sensor data are typically acquired by a mote operable to sense at least one parameter, and each instance has been correlated to an event having at least one representative feature. The instances may be stored in one or more digital data storage devices, such as the storage devices 100, 158, and 168, associated with the central computing devices 90, 156, and 166, respectively. In an alternative embodiment, at least one digital data storage device is remote to its associated computing device. The remote digital data storage device may be included in one or more motes.

In the embodiment illustrated in FIG. 7, the correlated sensor data is accessed from the storage devices 100, 158, and 168 by their associated central computing devices 90, 156, and 166, and transmitted over their associated communications links 108, 186, and 189, to the aggregating computing device 170. In an embodiment, each instance of the sensor data was acquired by at least one mote of a plurality of distributed motes, and each mote is part of a network of motes. Further, each instance of correlated sensor data may include an associated tentative event-identifier, which typically is generated and associated when the instance of correlating sensor data was found.

In an alternative embodiment (not illustrated), instances of correlated sensor data are pulled from the digital data storage devices in response to a request communicated to their respective central computing devices by the aggregating computing device 170. In another embodiment, instances of correlated sensor data are transmitted or pushed from the digital data storage devices by their associated central computing device to the aggregating computing device 170.

At block 204, the plurality of instances of correlated sensor data are received. At block 206, the plurality of instances of correlated sensor data are stored in an aggregating digital data storage device, such as the digital data storage device 190. The aggregating digital data storage device may be referred to in this specification as an event-data archive. In an alternative embodiment, the plurality of instances of sensor data stored in the event-data archive are protected by an information security measure. Such a protected or secured stored data arrangement may be referred to in this specification as a "data vault" or "data lock-box."

The information security measure typically includes providing at least one of maintaining information confidentiality, maintaining information integrity, and limiting access to authorized persons. The information security measure may be any security measure known to those skilled in the art, and at a selected level commensurate with the value of the information contained in the instances of correlated sensor data and any loss that might accrue from improper use, disclosure, or degradation. The information security measure may be implemented in software, hardware, infrastructure, networks, or any other appropriate manner. In an embodiment, the information security measure may be associated with the digital data storage device, the plurality of instances of correlated sensor data, and/or a computing device having a communication link with the digital data storage device.

Next, at block 208 the process 200 waits for more event data. If additional event data is received, the process moves to block 204 and receives the additional event data. The process 200 then proceeds to the stop block. In an alternative embodiment, the process 200 includes deleting at least a portion of the instances of correlated sensor data from the digital data storage devices 100, 158, and 168 after the instances have been transmitted to the aggregating computing device.

The process 200, when implemented in a computing device, causes the computing device to perform certain steps. For example, in an embodiment where the process 200 is implemented in a computing device, such as the aggregating computing device 170 of FIG. 6, the instructions are typically stored in a computer readable media, such as the storage media and/or memory of the computing device, and loaded into memory for use. In certain embodiments, the process 200 aggregates instances of sensor data correlating to an event from a plurality of remote digital data storage devices, and stores those instances on a digital data storage device associated with an aggregating computer as an event-data archive, such as the archival digital data storage device 190 of FIG. 7.

Figure 9:
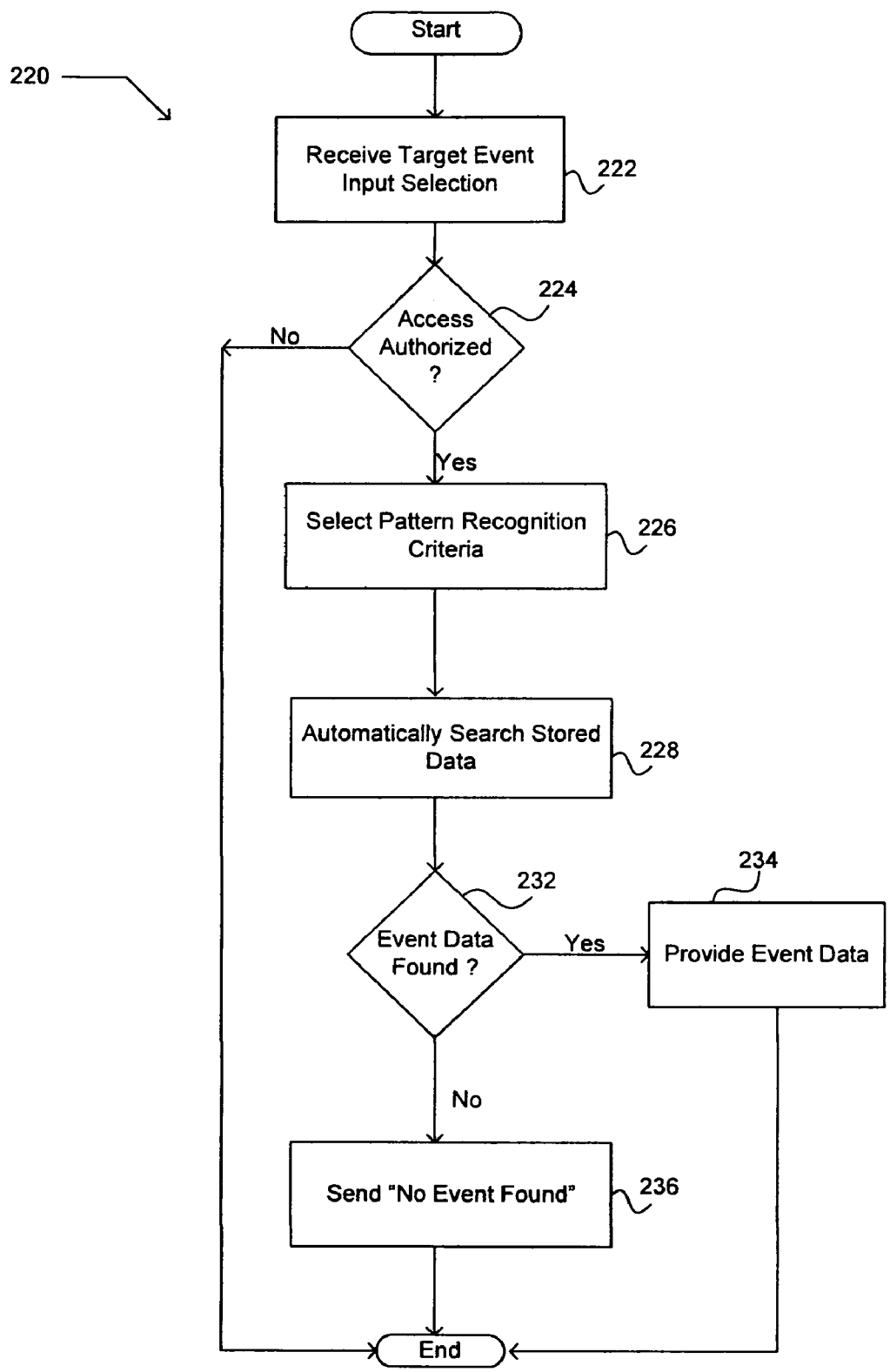
FIG. 9 is a flow diagram that illustrates exemplary steps of a process that searches and retrieves certain instances of stored correlated sensor data from an occurrence-data archive.

FIG. 9 is a flow diagram that illustrates exemplary steps of a process 220 that searches and retrieves certain instances of stored correlated sensor data from an event-data archive. After a start block, the process 220 moves to block 222. At block 222, an input selection is received from an input-selector corresponding to a target-event having at least one representative feature. The input-selector may include any entity, such as a machine, a computing device, and a user.

The input selection optimally further includes the input-selector tendering an access authorization, which is used to determine if the input-selector is a trusted entity. The tendered access authorization may be by any method or device required by a security measure protecting the instances of stored sensor data from unauthorized access, such as for example, a password, and thumb print. For example, a trusted entity may be a user, machine, or computing device, identified on a list of trusted parties. For example, the list of trusted parties may include employees and/or computing devices associated with the owner of the sensor network system. The tendered access authorization may be the input-selector's personal identification. Further, a trusted entity may be a member of a certain class, such as uniformed law enforcement officers, or computing devices maintained by agencies that employ uniformed law enforcement officers. For example, uniformed law enforcement officers may include members of the Federal Bureau of Investigation, Alcohol Tobacco and Firearms, state patrol, county sheriffs, and local police. Another example of a trusted party class is a prosecuting attorney, a defense attorney, and a judicial officer.

In a less preferred embodiment, the instances of stored sensor data are not protected by a security measure, and the input selection does not include tender of an access authorization.

At block 224, a decision operation determines if the tendered access authorization establishes the input-selector is a trusted entity and possesses an access right to the stored correlated sensor data. If the input-selector is a trusted entity and has an access right, the process branches to block 226. If the input-selector does not posses an access right, the process branches to the end block. If a security measure is not protecting the instances of stored sensor data, then the decision block 224 is not necessary and the process moves from decision block 222 to block 226.

At block 226, a pattern recognition criteria is selected corresponding to at least one representative feature of the target-event. The criteria is selected in a manner substantially similar to block 128 described in conjunction with FIGS. 6A and 6B, including the alternative embodiments. At block 228, in response to the input selection corresponding to the target-event, a plurality of instances of stored sensor data are automatically searched for data correlating to the target-event using the selected pattern recognition criteria.

At decision block 232, a decision operation determines if sensor data correlating to the at least one target-event representative feature is found. If the sensor data correlating to the target-event is not found, the process branches to block 236, where a message equivalent to "no data found" is provided. If sensor data correlating to the target-event is found, the process branches to block 234.

At block 236, the found correlated sensor data is provided. In an embodiment, the input-selector is the recipient of the correlated sensor data. In another alternative embodiment, a third party is the recipient of the correlated sensor data. The third party may include a machine, a computing device, and a user. In a further embodiment, the input-selector selects a third party recipient of the correlated sensor data. In an alternative embodiment, the process at block 222 further includes receiving an access authorization of the third part tendered by the input-selector, and the process at decision block 224 further includes determining if the third party recipient possesses an access right before providing the correlated sensor data to the third party. The process 220 then moves to the end block.

In a further alternative embodiment of the process 220, the search at block 228 proceeds in response to an input-selector designation of a target tentative-event-identifier. In this embodiment, the received plurality of instances of correlated sensor data each include an associated tentative-event-identifier. At block 222, the received target-event selection includes an input selection corresponding to a target tentative event-identifier. If a target tentative event-identifier is selected and no reason exists to search for a representative feature, the block 226 may be bypassed. At block 228, in response to the input selection corresponding to the target tentative event-identifier, the plurality of instances of sensor data are automatically searched for data correlating to the target tentative event-identifier. If any event data is found correlating to the target tentative event-identifier at decision block 232, the found sensor data correlating to the target tentative event-identifier is provided at block 234.

The process 220, when implemented in a computing device, causes the computing device to perform steps. In certain embodiments, the process 220 implements a process that searches and retrieves instances of stored sensor data from an event-data archive protected by a security measure, such as the archival digit data storage device 190 coupled to the computing device 170 of FIG. 7. In other embodiments, the process 220 uses a local computing device to search and retrieve instances of stored sensor data from remote digital data storage devices, such as the digital data storage device 168.

The process 220, when implemented in a computing device, causes the computing device to perform certain steps. For example, in an embodiment where the process 220 is implemented in a computing device, such as the aggregating computing device 170 of FIG. 7, the instructions are typically stored in a computer readable media, such as the storage media and/or memory of the computing device, and loaded into memory for use.

An exemplary system employing certain embodiments described above may be illustrated by three network systems of distributed sensors, and an aggregating computing device. Referring to FIG. 7, the illustrative exemplary system includes the previously described exemplary network system of distributed acoustic sensors placed on city traffic lights as the first sensor network 70, an exemplary network system of distributed digital image capture devices located in city parking garages and lots as the second sensor network 152, and an exemplary network of distributed heat/fire thermal sensors located in city buildings as the third sensor network 162. Each exemplary sensor network automatically stores correlated sensor data in an associated retained data storage, such as the digital data storage devices 100, 158, and 168.

As with FIG. 5, while the illustrative exemplary system describes the networked system as owned by the city, the illustrative exemplary system may have any ownership, such as a private, public, and governmental, and may be used for any purpose, such as private, public, governmental, and military. Further, the sensor networks may have different owners. For example, the first sensor network 70 may be owned by the city, the second sensor network 152 may be privately owned by a parking garage operator, and the third sensor network 162 may be privately owned by a fire alarm company.

The illustrative exemplary system further includes an aggregating computing device communications linked to the sensor networks, such as the aggregating computing device 170 and its archival digital data storage device 190. The central computing devices of the three networks transmit the correlated sensor data from their retained data storage to the aggregating computing device. The aggregating computing device receives and stores the correlated sensor data from the three networks in an event-data archive on its associated digital data storage device, such as device 190. The event-data archive includes a data structure suitable for later search and retrieval. The event-data archive is subject to an information security measure that protects the sensor data stored in the event-data archive from unauthorized access. The security measure is controlled by the aggregating computing device. The central computing devices delete the correlated sensor data from their associated retained data storage after transmission to the aggregating computing device. This frees storage space for the constant stream of additional correlated sensor data that is continuously transmitted by motes of their respective mote networks.

A requesting entity may be an employee or official of an owner or operator of one of the sensor networks, or may be a potentially authorized person, machine, network or other entity. A requesting entity desiring sensor data on an event, such as shooting, enters a gunshot target-event selection on a user input device of the aggregating computing device, and tenders an identification number as an access authorization.

In this example, the gunshot (event 6 of FIG. 4) may have occurred near an intersection controlled by a city traffic light at a known date.

An event-data retrieval process operating on the aggregating computing device receives the target-event selection and the employee identification number. The process determines that the requesting entity is a trusted entity and possesses an access right. In response to the gunshot target-event selection, the event-data retrieval process automatically selects a pattern recognition criteria corresponding to at least one representative feature of a gunshot. Then, the event-data retrieval process in response to the gunshot input selection, automatically searches the event-data archive for instances of acoustic sensor data correlating to the at least one representative feature of a gunshot on the known date. Correlating found instances of archived sensor data are provided to the requesting entity, or a trusted third party selected by the requesting entity.

In further reference to FIG. 9, another embodiment provides a process that searches and retrieves certain instances of stored correlated sensor data from an event-data archive. After a start block, the embodiment includes receiving an input selection from an input-selector, similar to the process 220 at block 222. The input selection corresponds to a target-occurrence having a representative feature. A filter corresponding to the representative feature of the target-occurrence is selected. A plurality of instances of occurrence data stored in a data set are filtered for data correlating to the target-occurrence representative feature a using the selected filter. Each instance of the stored occurrence data has a representative feature. An output responsive to the filtering is provided. The process then ends. The filtering step may further include automatically filtering the data stored in the data set. In a further embodiment, the output responsive to the filtering correlates to a target-occurrence representative feature, which is stored in another data set. Alternatively, in another embodiment, the output responsive to the filtering does not correlate to a target-occurrence representative feature. The non-correlating output is stored in anther data set.

Figure 10:
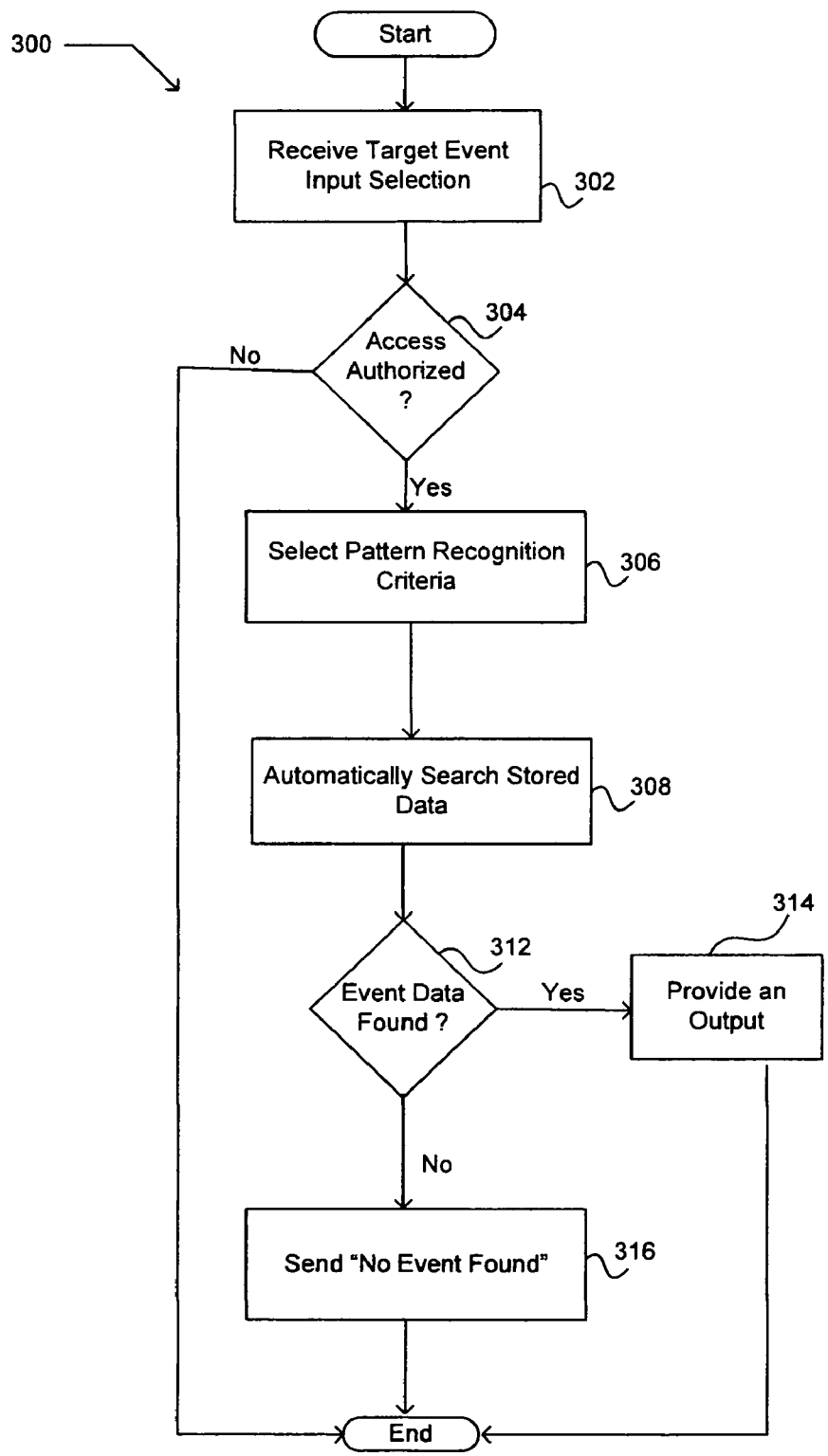
FIG. 10 is a flow diagram illustrating exemplary steps of a process that searches a plurality of instances of occurrence data stored in a data vault or data lock box and provides an output.

FIG. 10 is a flow diagram illustrating exemplary steps of a process 300 that searches a plurality of instances of event data stored in a data vault or data lock box and provides an output. Each instance of the event data has at least one representative feature, is stored in a digital data storage device, and is protected by an information security measure. The digital data storage device may be a local digital data storage device or a remote digital data storage device. The information security measure may be associated with the digital data storage device, the plurality of instances of stored event data, and/or a computing device having a communication link with the digital data storage device. In another embodiment, the digital data storage device includes a portable digital data storage device, such as an external hard drive, a DVD, a CD, a floppy disk, and a flash memory device. In a further embodiment, the event data includes sensor data generated by a plurality of networked motes.

The process 300 is similar to the process 220. After a start block, the process 300 moves to block 302. At block 302, an input selection is received from an input selector, the input selection corresponding to a target-event having at least one representative feature. The received input selection further includes an output recipient selection and a tendered access authorization.

At block 304, in response to the tendered access authorization, a decision operation determines if an access right to the plurality of instances of stored event data protected by the information security measure is possessed by at least one of the input-selector and the recipient. If the decision operation determines that either the input-selector and/or the recipient are a trusted entity and posses an access right to the instances of stored event data, the process branches to block 306. If neither the input-selector nor the recipient is a trusted entity, the process branches to the end block. In an alternative embodiment, the input-selector and the recipient must each possess an access right.

At block 306, a pattern recognition criteria is selected corresponding to at least one representative feature of the target event. The criteria is selected in a manner substantially similar to block 128 described in conjunction with FIGS. 6A and 6B, and to block 226 described in conjunction with FIG. 9, including the alternative embodiments.

At block 308, in response to the input selection corresponding to the target event, the plurality of instances of stored event data are automatically searched for data correlating to the at least one target-event representative feature using the selected pattern recognition criteria.

At decision block 312, a decision operation determines if event data correlating to the at least one target-event representative feature was found. If the event data correlating to the target-event representative feature was not found, the process branches to block 316, where a message equivalent to "no data found" is provided. If event data correlating to the target was found, the process branches to block 314. At block 314, an output indicative of the result of the automatic search at block 308 is provided to the recipient.

In a further alternative embodiment of the process 300, the search at block 308 proceeds in response to an input-selector designation of a target tentative event-identifier in a substantially similar manner as the process 200 described in conjunction with FIG. 9.

The process 300, when implemented in a computing device, causes the computing device to perform certain steps. For example, in an embodiment where the process 300 is implemented in a computing device, such as the aggregating computing device 170 of FIG. 7, the instructions are typically stored in a computer readable media, such as the storage media and/or memory of the computing device, and loaded into memory for use.

Figure 11:
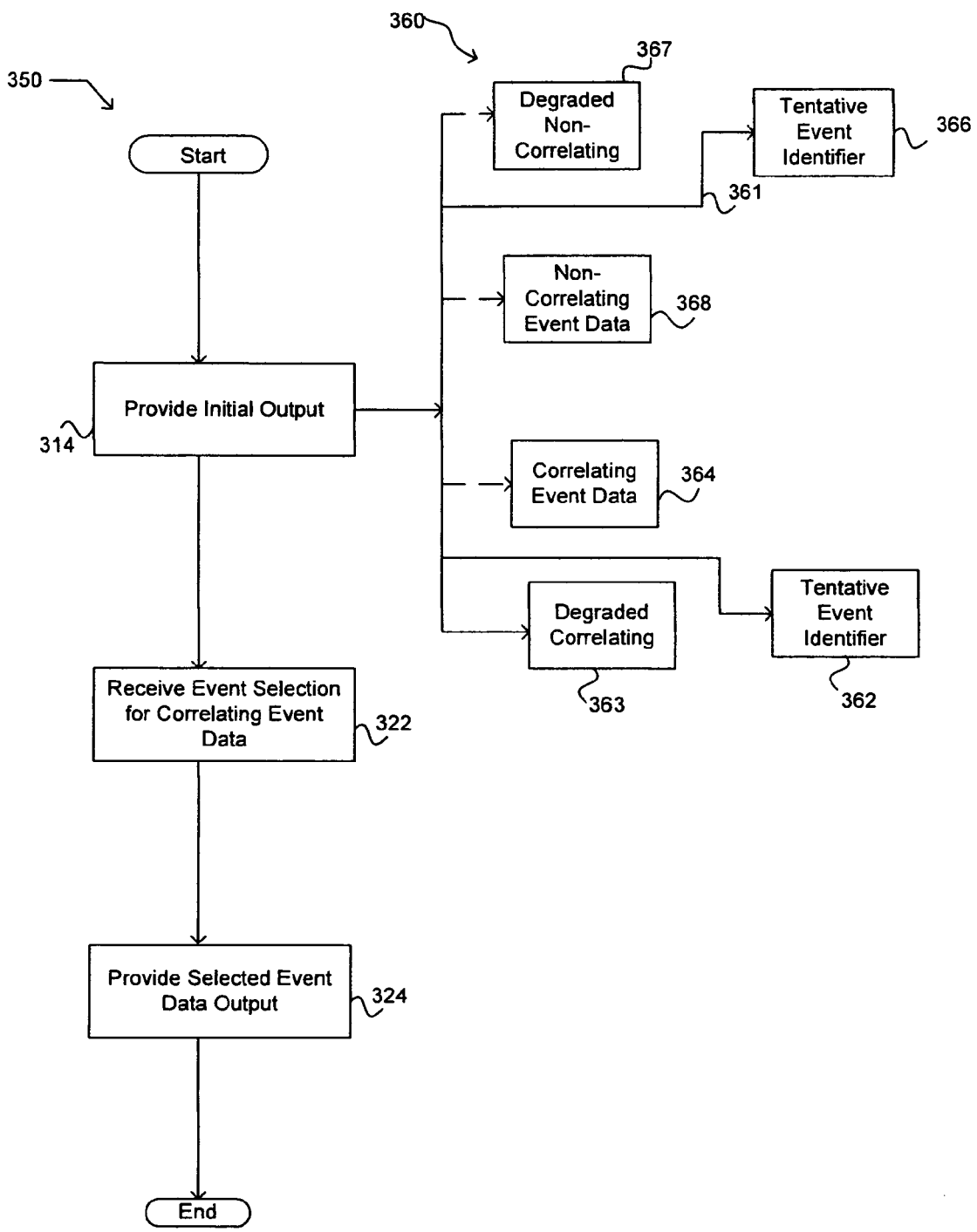
FIG. 11 is a flow diagram illustrating exemplary steps of a process providing the output of FIG. 10.

FIG. 11 is a flow diagram illustrating exemplary steps of a process 350 providing the output of the block 314 of FIG. 10. The illustrated embodiment includes a set of possible outputs 360 from the output at block 314. The set of possible outputs 360 illustrated in FIG. 11 includes a first subset of outputs for event data correlating to the target-event representative feature, and a second subset of outputs for event data not correlating to the target-event representative feature, i.e., non-correlating. The first subset includes a correlating tentative event-identifier 362, a degraded correlating event-data representation 363, and a correlating event data 364. The second subset includes a non-correlating tentative event-identifier 366, a degraded non-correlating event-data representation 367, and a non-correlating event data 368. The process 350 at block 314 includes a default configuration, indicated by solid hierarchal lines 361, that provides the correlating tentative event-identifier 362 and the non-correlating tentative event-identifier 366. In an alternative embodiment, the output configuration provides the degraded correlating event-data representation 363 and the degraded non-correlating event-data representation 367. In another alternative embodiment, the output configuration provides only the correlating event data 364.

At block 314, the initial output is provided to the input-selector and/or recipient in any manner and using any output device, such as being displayed on a monitor of a computing device. For example, the output may include displaying a table having columns that include an event data date, a tentative event identifier, and a correlating/non-correlating status. Individual instances of the plurality of instances of stored event data are individually displayed in rows of the table. For example, in response to a target-event selection of a gunshot, which is event 6 of FIG. 4, one row may display a date of May 17, 2004, a tentative event-identifier of a "gunshot," and a status of "correlating." Another row may display the same date of May 17, 2004, a tentative event-identifier of "unknown" because no correlation to a representative feature of a gunshot was found, and a status of "non-correlating." In an alternative embodiment, the output at block 314 may include a ranking for at least two instances of the correlating event data in a hierarchy of the found correlating event data. For example, if the provided output in the above example includes a plurality of events having "gunshot" tentative event-identifiers, the provided output may further include a relative or absolute ranking based on the acoustic intensity of the respective events as an aid to the recipient in evaluating the event data.

At block 322, an event-data selection is received from the input-selector, who may be the recipient. The selection corresponds to at least one of the instances of event data provided by the process at block 314 and requests provision of more detail related to the provided instances. In the default configuration, the input selection may correspond to a tentative event-identifier. For example, the input selection may request provision of degraded correlating event data corresponding to the event of May 17, 2004, and tentatively identified as gunshot.

At block 324, the selected event data is provided in a form of degraded correlating data. In an embodiment, the degraded correlating event data includes sufficient data for the recipient to make a preliminary determination whether the event appears to be a gunshot. For example the recipient may listen to the degraded data or view a display of a time-frequency analysis of the degraded data. The process 350 then terminates at the end block.

If the recipient possesses an access authorization for the correlating event data 364, the event-data selection may include receiving another input selection that requests that the correlating event-data be provided. The process at block 316 receives the another event-data selection, and at block 318 provides the output. Continuing with the above example, the recipient may request complete event data (364) from all the sensors that correlates to the gunshot.

The process 350, when implemented in a computing device, causes the computing device to perform certain steps. For example, in an embodiment where the process 350 is implemented in a computing device, such as the aggregating computing device 170 of FIG. 6, the instructions are typically stored in a computer readable media, such as the storage media and/or memory of the computing device, and loaded into memory for use.

Figure 12:
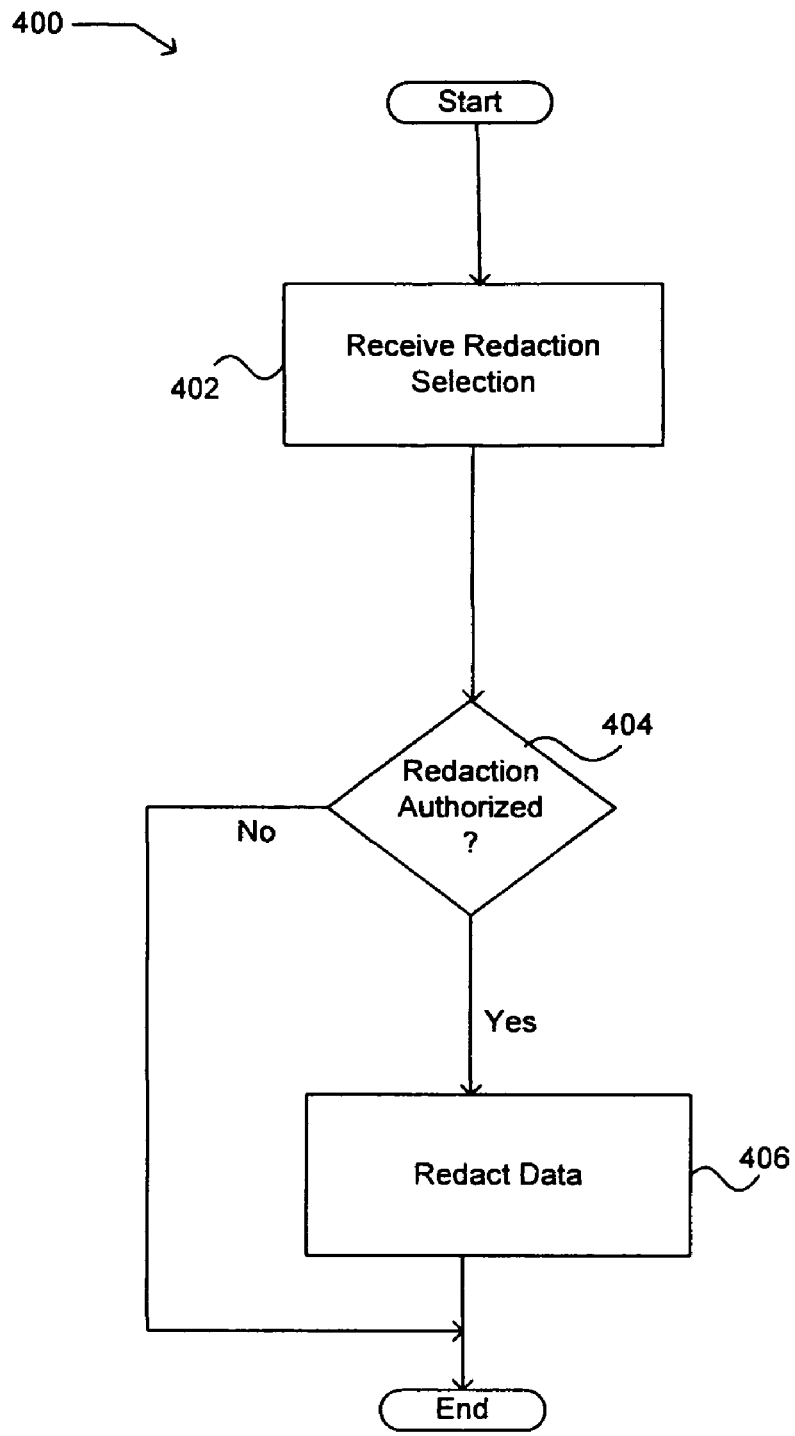
FIG. 12 is a flow diagram illustrating exemplary steps of a process that redacts a selected instance of occurrence data from the plurality of instances of stored occurrence data described in conjunction with FIG. 10.

FIG. 12 is a flow diagram illustrating exemplary steps of a process 400 that redacts a selected instance of event data from the plurality of instances of stored event data described in conjunction with FIG. 10. After a start block, the process moves to block 402, where a redaction selection and a tendered redaction authorization are received. The redaction selection includes a selection of at least one of the plurality of instances of event data. In an embodiment, the redaction selection may be correlated with the provided output at block 314 of FIGS. 10 and 11. Using the above example where a plurality rows are displayed in a table on a monitor, individual target-event-identifiers may be hyperlinked. This allows an input-selector to select an event for redaction by activating a link in a displayed row.

At block 404, in response to the tendered redaction authorization, a decision operation determines if at least one of the input-selector and the recipient possess a redaction right to the plurality of instances of stored event data protected by the information security measure. If the decision operation determines that either the input-selector and/or the recipient are a trusted entity and posses a redaction right, the process branches to block 406. If neither the input-selector nor the recipient is a trusted entity, the process branches to the end block.

At block 406, the selected event data is redacted from the plurality of instances of the stored event data. The redacted instance of event data may or may not correlate to the at least one target-event representative feature. The process 400 then terminates at the end block.

The process 400, when implemented in a computing device, causes the computing device to perform certain steps. For example, in an embodiment where the process 400 is implemented in a computing device, such as the aggregating computing device 170 of FIG. 7, the instructions are typically stored in a computer readable media, such as the storage media and/or memory of the computing device, and loaded into memory for use.

An exemplary system employing certain embodiments described in conjunction with FIGS. 10-12 may be illustrated using the exemplary system of the three network systems of distributed sensors and the aggregating computing device previously described in conjunction with FIG. 9. Continuing with the previous illustration, the event-data archive associated with the aggregating computing device now contains correlating event data acquired from the three-network system over time, such as a year. The gunshot has resulted in litigation, and the litigants request discovery of correlating event data in the city's data vault, which is the city's event-data archive protected by a security measure. The city is willing to provide relevant instances event data to the litigants and a court, but unwilling to provide other instances of event data based on proprietary and citizen privacy concerns.

A trusted person designated by the court and given an access authorization by the city provides an input selection corresponding to the gunshot event of May 17, 2004. For example, the trusted person may be a neutral expert, an expert witness for a party, and a magistrate. The input selection is received by an archival event-data process described in conjunction with FIGS. 10-12, and a determination made that the trusted person acting as an input-selector possesses an access right to the data vault. In response to the gunshot target-event selection, the archival event-data retrieval process automatically selects a pattern recognition criteria corresponding to at least one representative feature of a gunshot. The archival event-data retrieval process, in response to the gunshot input selection, automatically searches the event-data archive for instances of acoustic sensor data correlating to the at least one representative feature of a gunshot on the known date.

An initial output indicative of the search result is provided to the trusted person. In the exemplary embodiment, the default output configuration described above provides a table displaying the correlating tentative gunshot-identifiers (362) and the non-correlating tentative gunshot-identifiers (366) in rows. The trusted person provides an event-data selection that corresponds to at least one of the instances of tentative gunshot-identifiers initially provided by the process. For example, an initial output may indicate that a plurality of sensors generated acoustical data correlating to at least one representative feature of a gunshot, and the input selector selects three of these instances. The event-data selection is received from the input-selector, and the archival event-data retrieval process provides the trusted person with the three selected instances of degraded correlating event data corresponding to the gunshot. The trusted person listens to the three instances of degraded event data. If the trusted person concludes two of the three instances of event data relate to the gunshot, the trusted person then requests and is provided with the two complete event data for the two instances.

Another embodiment of the exemplary archival event-data process provides a redaction whereby the city through a representative, or the trusted person, may remove certain instances of event data from the plurality of instances of event data in the city's data vault. The redacted data vault may then be given to a third party much like a redacted paper document. Preferably, the city retains a duplicate of their data vault prior to beginning the redaction-process. The process includes receiving the redaction selection from the trusted party, and a tender of a redaction authorization. For example, the redaction selection may be formulated in terms of redacting all event data except for the three selected instances of event data correlating to a gunshot. Alternatively, the redaction selection may be inverted to redact only the three selected instances of event data correlating to a gunshot. Since redaction involves alteration of data from the data vault, the city may require a separate redaction right in addition to the access right.

The process determines that the trusted party possesses a redaction right. In response to the redaction selection, all but the three instances of event data are redacted from the data vault. The data vault and the three selected instances of gunshot data stored therein may be made accessible to others involved in the litigation.

Figure 13:
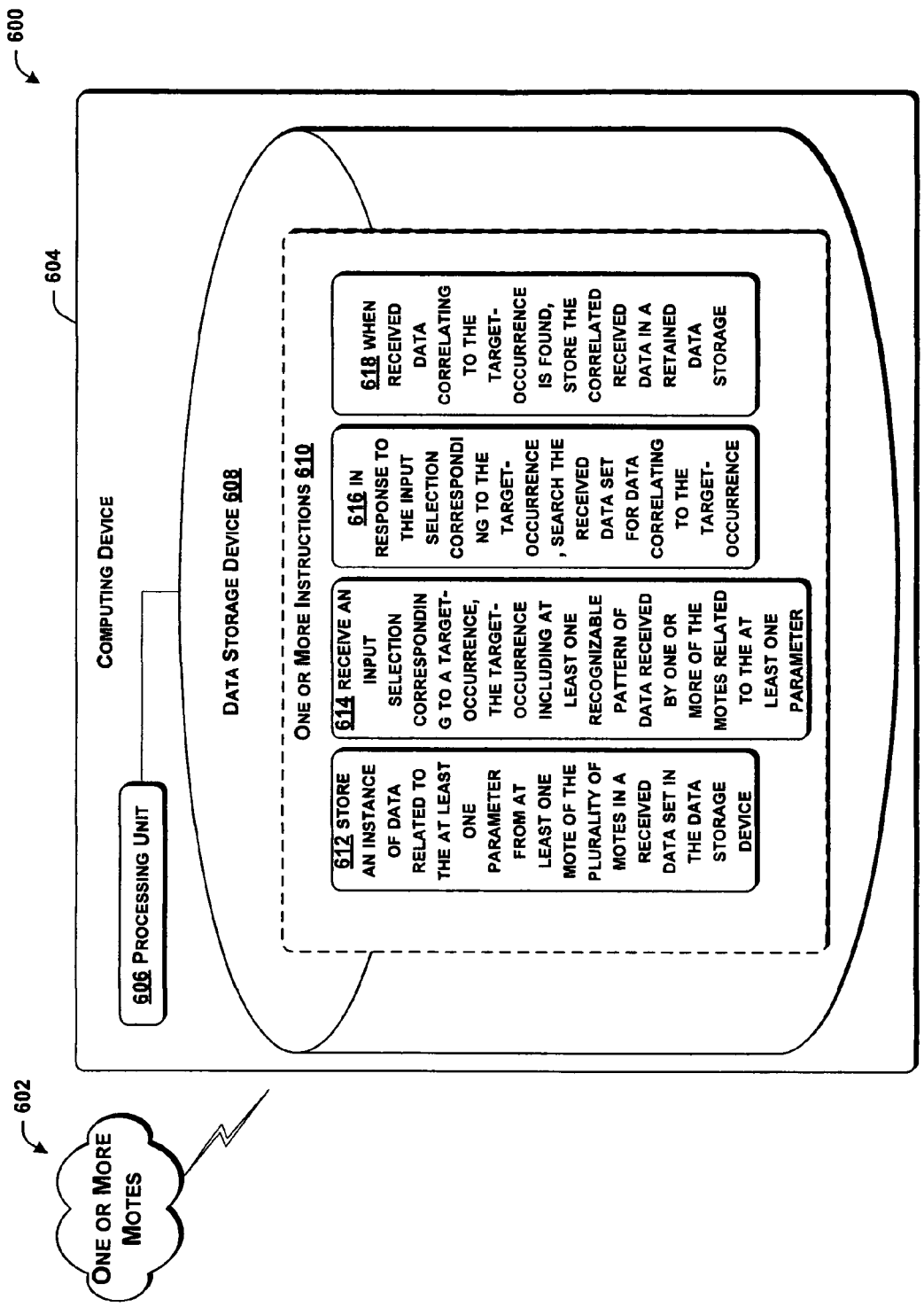
FIGS. 13 through 22 show schematic views of systems in accordance with further embodiments in accordance with the teachings of the present disclosure.

FIG. 13 shows a schematic view of a system 600 in accordance with further embodiments in accordance with the teachings of the present disclosure. In this embodiment, the system 600 includes a plurality of motes 602, each mote being respectively operable to receive and communicate data related to at least one parameter. A computing device 604 (e.g. processor, application specific integrated circuit (ASIC), computer, circuitry, analog device, field programmable gate array (FPGA), programmable logic device (PLD), etc.) is operable to communicate with the plurality of motes 602. The computing device 604 includes a processing unit 606 coupled to a data storage device 608. One or more instructions 610 are loaded on the data storage device 608 that, when executed by the processing unit 606, configure the computing device 604 to: store an instance of data related to the at least one parameter from at least one mote of the one or more motes in a received data set in the data storage device 612, receive an input selection corresponding to a target-occurrence, the target-occurrence including at least one recognizable pattern of data received by at least one mote of the one or more motes related to the at least one parameter 614, in response to the input selection corresponding to the target-occurrence, search the received data set for data correlating to the target-occurrence 616, and when received data correlating to the target occurrence is found, store the correlated received data in a retained data storage 618.

Figure 14:
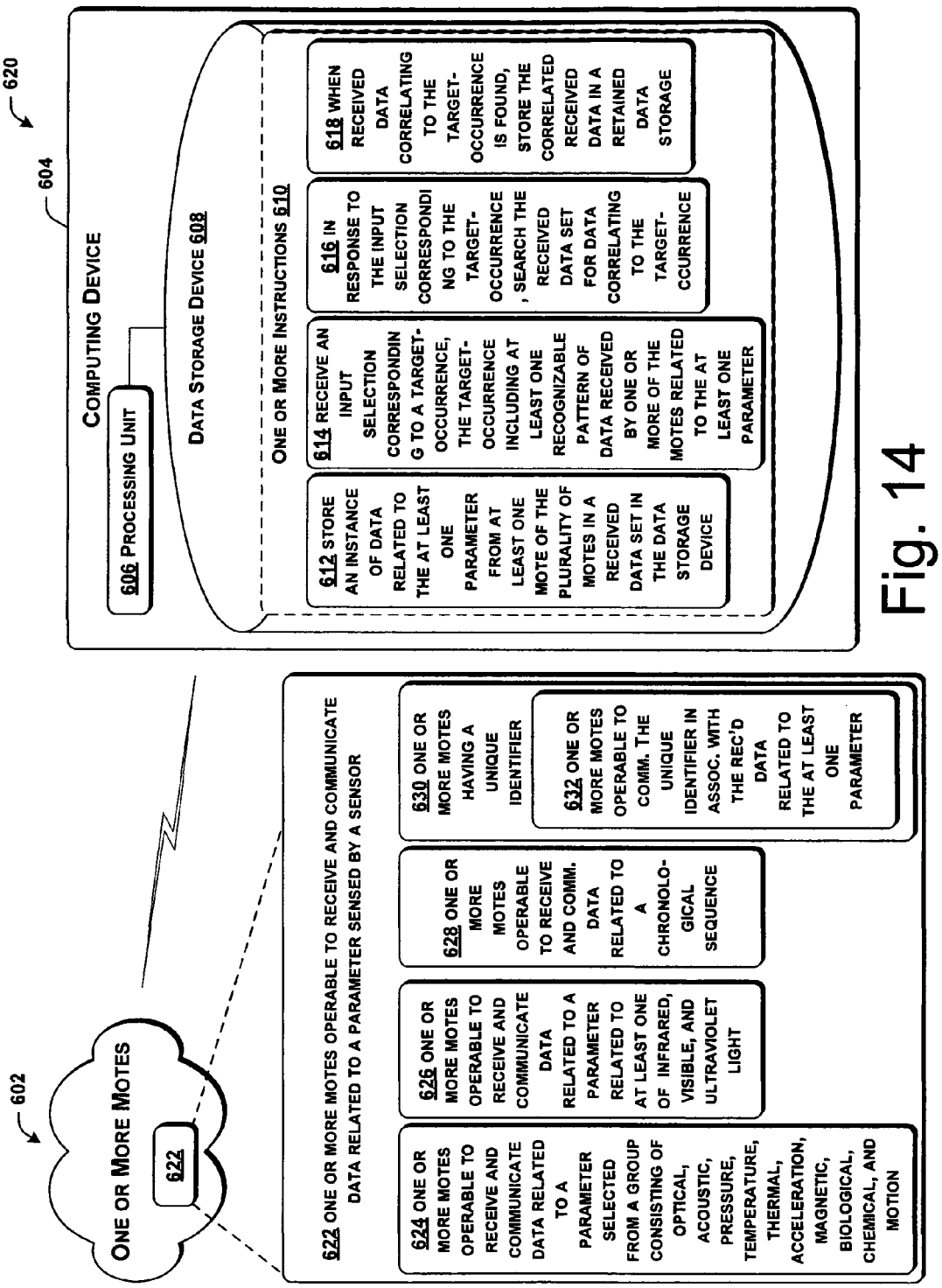

FIG. 14 shows a schematic view of a system 620 in accordance with further embodiments in accordance with the teachings of the present disclosure. As shown in FIG. 14, in some implementations, the one or more motes 602 of the system 620 may include one or more motes operable to receive and communicate data related to a parameter sensed by a sensor 622. More specifically, in some implementations, the one or more motes operable to receive and communicate data related to a parameter sensed by a sensor 622 may include one or more motes operable to receive and communicate data related to a parameter selected from a group consisting of optical, acoustic, pressure, temperature, thermal, acceleration, magnetic, biological, chemical, and motion 624. Similarly, the one or more motes operable to receive and communicate data related to a parameter sensed by a sensor 622 may include one or more motes operable to receive and communicate data related to a parameter related to at least one of infrared, visible, and ultraviolet light 626. In further implementations, the one or more motes operable to receive and communicate data related to a parameter sensed by a sensor 622 may include one or more motes operable to receive and communicate data related to a chronological sequence 628. Similarly, the one or more motes operable to receive and communicate data related to a parameter sensed by a sensor 622 may include one or more motes having a unique identifier 630. For example, in some implementations, the one or more motes having a unique identifier 630 may include one or more motes operable to communicate the unique identifier in an association with the received data related to the at least one parameter 632.

Figure 15:
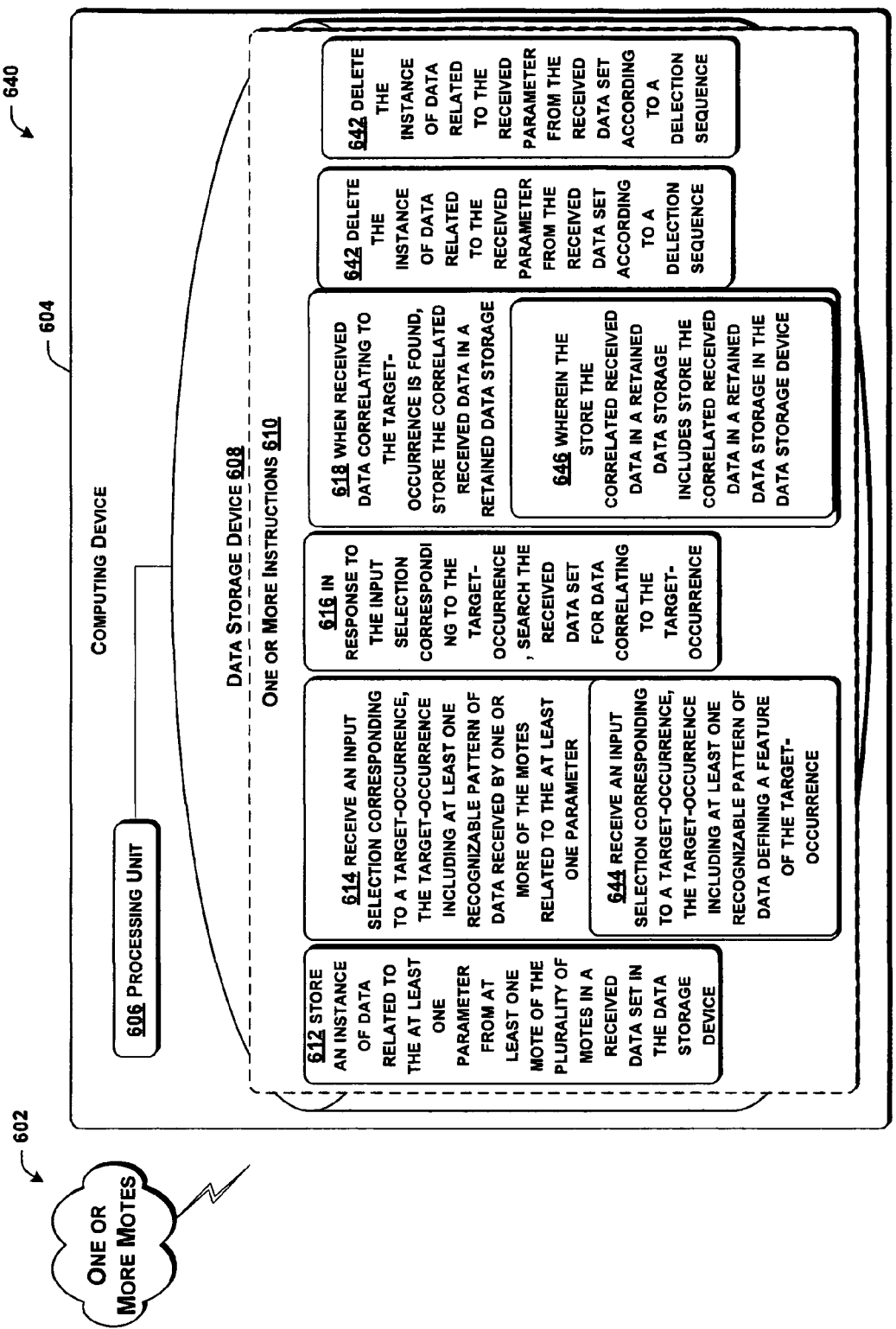

FIG. 15 shows a schematic view of a system 640 in accordance with further embodiments in accordance with the teachings of the present disclosure. As shown in FIG. 15, in some implementations, the system 640 may further include one or more instructions 610 loaded on the data storage device 608 that, when executed by the processing unit 606, configure the computing device 604 to delete the instance of data related to the received parameter from the received data set according to a deletion sequence 642.

Similarly, in some implementations, the receive an input selection corresponding to a target-occurrence, the target-occurrence including at least one recognizable pattern of data received by at least one mote of the one or more motes related to the at least one parameter 614 may include receive an input selection corresponding to a target-occurrence, the target-occurrence including at least one recognizable pattern of data defining a feature of the target-occurrence 644. In further implementations, the when received data correlating to the target-occurrence is found, store the correlated received data in a retained data storage 618 may include when received data correlating to the target-occurrence is found, store the correlated received data in a retained data storage 618 may include store the correlated received data in a retained data storage in the data storage device 646.

Figure 16:
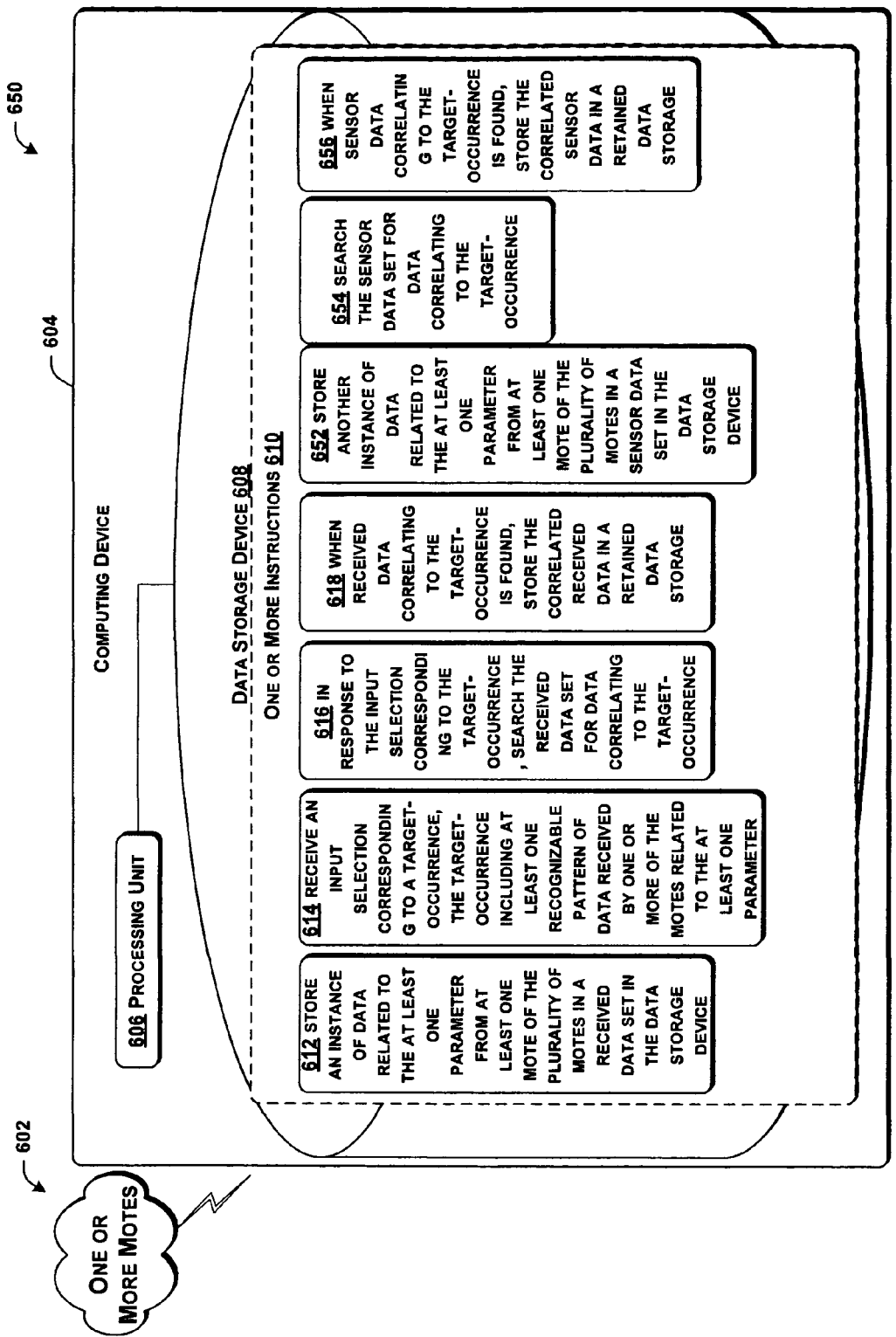

FIG. 16 shows a schematic view of a system 650 in accordance with further embodiments in accordance with the teachings of the present disclosure. As shown in FIG. 16, in some implementations, the system 650 may further include one or more instructions 6.10 loaded on the data storage device 608 that, when executed by the processing unit 606, configure the computing device 604 to store another instance of data related to the at least one parameter from at least one mote of the plurality of motes in a sensor data set in the data storage device 652, search the sensor data set for data correlating to the target-occurrence 654, when sensor data correlating to the target-occurrence is found, store the correlated sensor data in a retained data storage 656.

Figure 17:
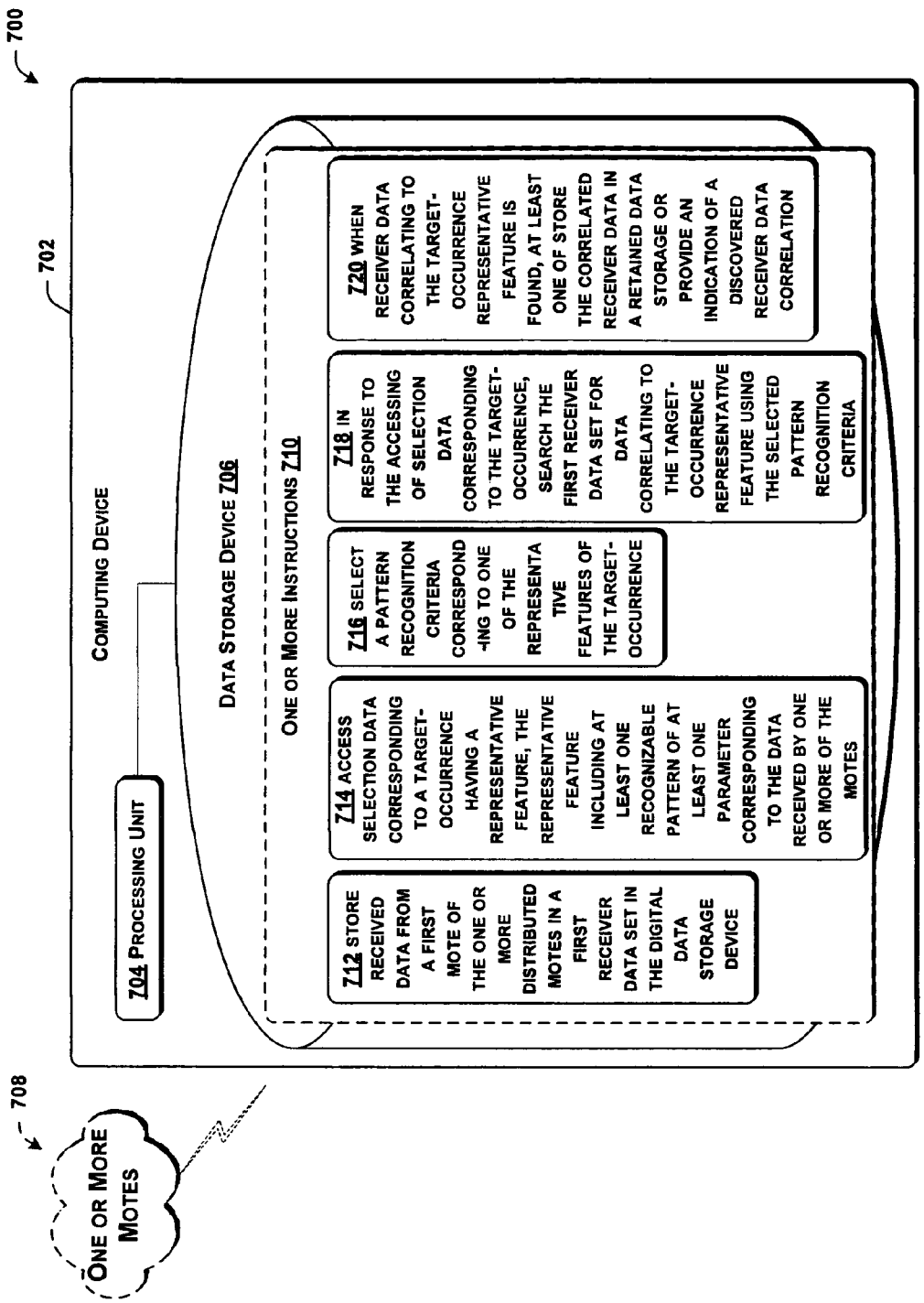

FIG. 17 shows a schematic view of a system 700 in accordance with further embodiments in accordance with the teachings of the present disclosure. In this embodiment, the system 700 includes a computing device 702 having a processing unit coupled to a digital data storage device and being operable to communicate with the one or more-distributed motes (e.g. one or motes 708), each mote operable to receive data representing a respective feature, and to communicate the received data to the computing device 706, the respective feature having a correlation to an occurrence.

In this embodiment, the system 700 further includes one or more instructions 710 loaded on the digital data storage device 706 that, when executed by the processing unit 704, configure the computing device 704 to store received data from a first mote of the one or more distributed motes in a first receiver data set in the digital data storage device 712, access selection data corresponding to a target occurrence having a representative feature, the representative feature including at least one recognizable pattern of at least one parameter corresponding to the data received by one or more of the motes 714, select a pattern recognition criteria corresponding to one of the representative features of the target occurrence 716, in response to the accessing of selection data corresponding to the target occurrence, search the first receiver data set for data correlating to the target-occurrence representative feature using the selected pattern recognition criteria 718, and when receiver data correlating to the target occurrence representative feature is found, at least one of store the correlated receiver data in a retained data storage or provide an indication of a discovered receiver data correlation 720.

Figure 18:
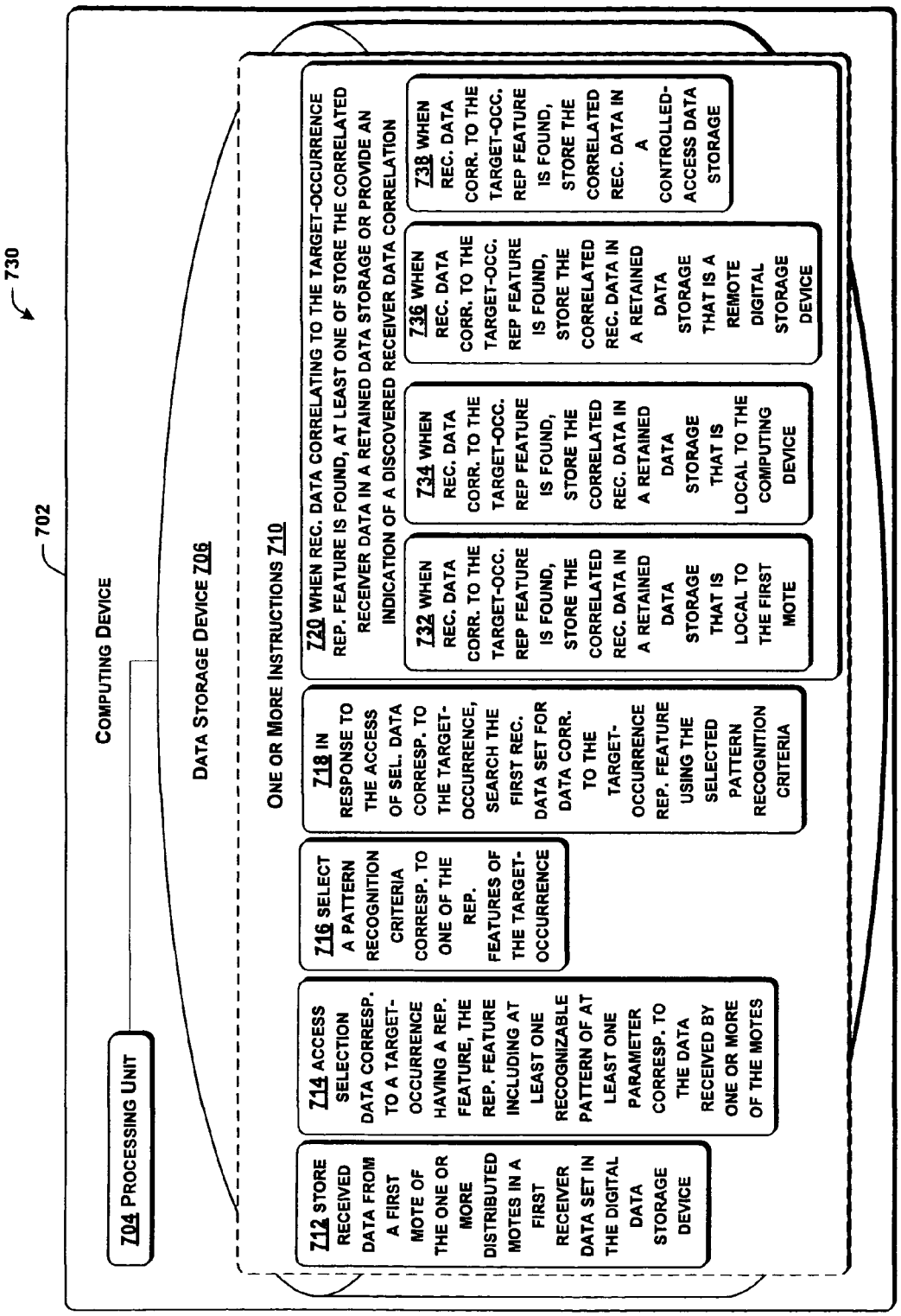

FIG. 18 shows a schematic view of a system 730 in accordance with further embodiments in accordance with the teachings of the present disclosure. As shown in FIG. 18, in some implementations, the system 730 may further include one or more instructions 710 loaded on the data storage device 706, wherein when receiver data correlating to the target-occurrence representative feature is found, at least one of store the correlated receiver data in a retained data storage or provide an indication of a discovered receiver data correlation 730 includes when receiver data correlating to the target-occurrence representative feature is found, store the correlated receiver data in a retained data storage that is local to the first mote 732. Similarly, the system 730 may further include one or more instructions 710 loaded on the data storage device 706, wherein when receiver data correlating to the target-occurrence representative feature is found, at least one of store the correlated receiver data in a retained data storage or provide an indication of a discovered receiver data correlation 730 includes when receiver data correlating to the target-occurrence representative feature is found, store the correlated receiver data in a retained data storage that is local to the computing device 734.

As further shown in FIG. 18, in further implementations, the system 730 may further include one or more instructions 710 loaded on the data storage device 706, wherein when receiver data correlating to the target-occurrence representative feature is found, at least one of store the correlated receiver data in a retained data storage or provide an indication of a discovered receiver data correlation 730 includes when receiver data correlating to the target-occurrence representative feature is found, store the correlated receiver data in a retained data storage that is a remote digital storage device 736. Similarly, the system 730 may further include one or more instructions 710 loaded on the data storage device 706, wherein when receiver data correlating to the target-occurrence representative feature is found, at least one of store the correlated receiver data in a retained data storage or provide an indication of a discovered receiver data correlation 730 includes when receiver data correlating to the target-occurrence representative feature is found, store the correlated receiver data in a controlled-access data storage 738.

Referring again to FIG. 17, in some implementations, the computing device 702 of the system 700 may be operable to communicate with the one or more distributed motes 704 in various ways. For example, in some implementations, the computing device having a processing unit coupled to a digital data storage device and being operable to communicate with the one or more distributed motes may include a computing device having a processing unit coupled to a digital data storage device and being operable to communicate with the one or more distributed motes over a communications link. More specifically, in further implementations, the computing device having a processing unit coupled to a digital data storage device and being operable to communicate with the one or more distributed motes over a communications link may include a computing device having a processing unit coupled to a digital data storage device and being operable to communicate with the one or more distributed motes over a communications link that includes at least one of an optical link, a wireless link, or a wired link. In further implementations, the computing device having a processing unit coupled to a digital data storage device and being operable to communicate with the one or more distributed motes may include a computing device having a processing unit coupled to a digital data storage device and being operable to communicate with the one or more distributed motes over a communications link that includes an intermediate mote that relays a communication between one or more other motes and the computing device.

Figure 19:
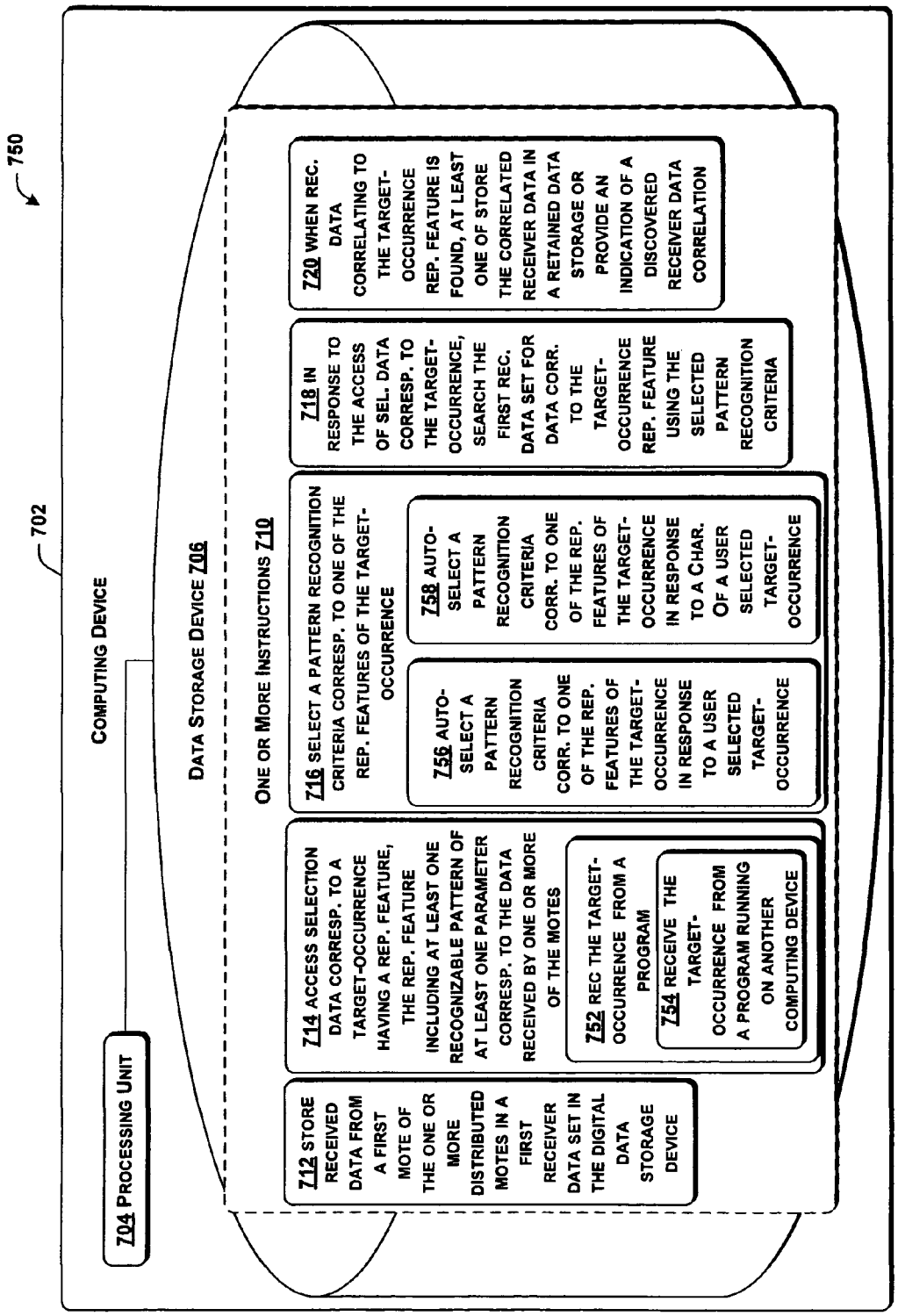

FIG. 19 shows a schematic view of a system 750 in accordance with further embodiments in accordance with the teachings of the present disclosure. As shown in FIG. 19, in some implementations, the one or more instructions loaded on the digital data storage device that, when executed by the processing unit, configure the computing device to access selection data corresponding to a target-occurrence having a representative feature, the representative feature including at least one recognizable pattern of at least one parameter corresponding to the data received by one or more of the motes 714 may include one or more instructions loaded on the digital data storage device that, when executed by the processing unit, configure the computing device to receive the target-occurrence from a program 752. More specifically, the one or more instructions loaded on the digital data storage device that, when executed by the processing unit, configure the computing device to receive the target-occurrence from a program 752 may include one or more instructions loaded on the digital data storage device that, when executed by the processing unit, configure the computing device to receive the target-occurrence from a program running on another computing device 754.

As further shown in FIG. 19, in some implementations, the one or more instructions loaded on the digital data storage device that, when executed by the processing unit, configure the computing device to select a pattern recognition criteria corresponding to one of the representative features of the target-occurrence 716 may include one or more instructions loaded on the digital data storage device that, when executed by the processing unit, configure the computing device to automatically select a pattern recognition criteria corresponding to one of the representative features of the target-occurrence in response to a user selected target-occurrence 756. Similarly, in further implementations, the one or more instructions loaded on the digital data storage device that, when executed by the processing unit, configure the computing device to select a pattern recognition criteria corresponding to one of the representative features of the target-occurrence 716 may include one or more instructions loaded on the digital data storage device that, when executed by the processing unit, configure the computing device to automatically select a pattern recognition criteria corresponding to one of the representative features of the target-occurrence in response to a characteristic of a user selected target-occurrence 758.

Figure 20:
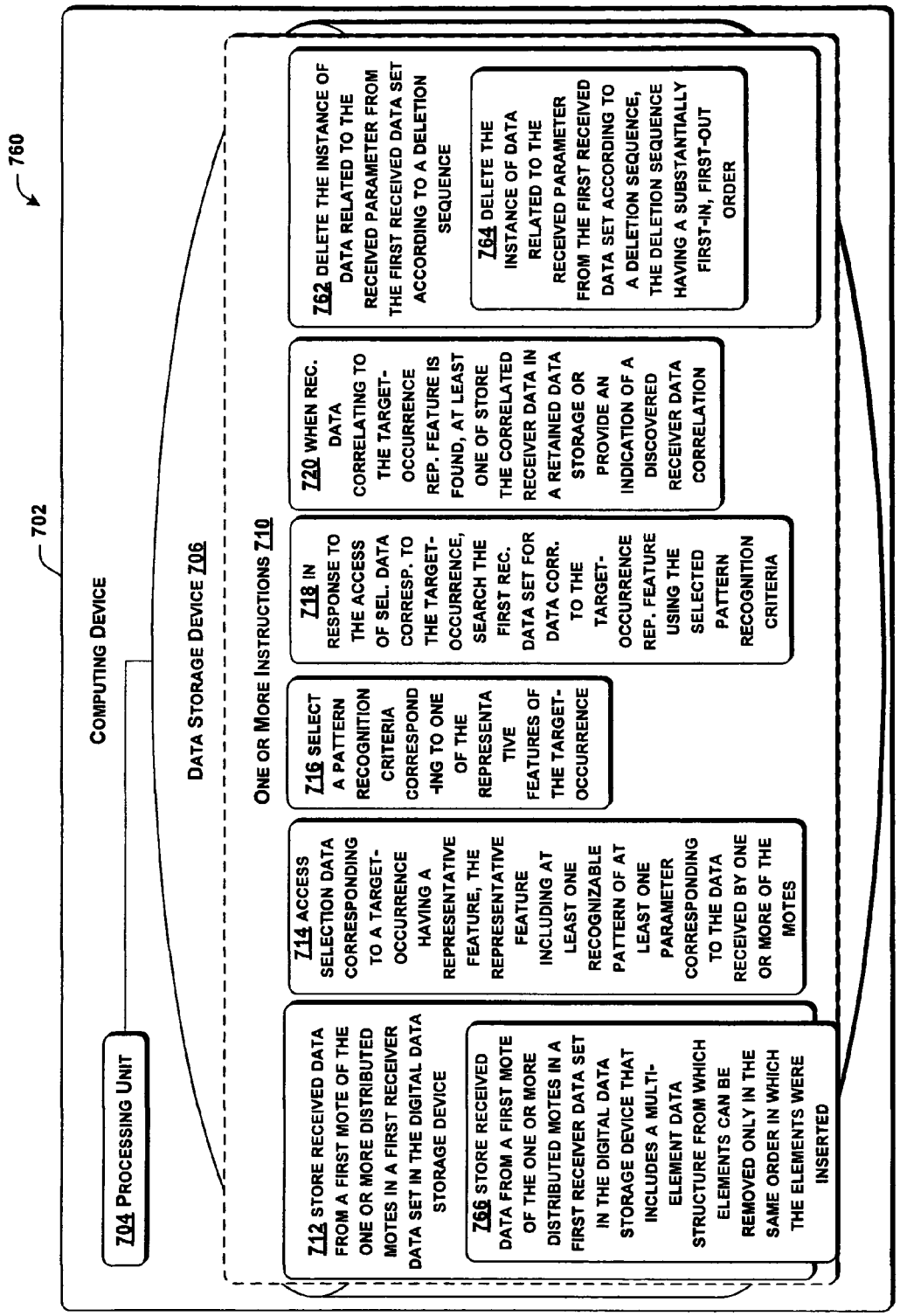

FIG. 20 shows a schematic view of a system 760 in accordance with further embodiments in accordance with the teachings of the present disclosure. As shown in FIG. 20, in some implementations, the system 760 may include one or more instructions 710 loaded on the digital data storage device 706 that, when executed by the processing unit 704, further configure the computing device 702 to delete the instance of data related to the received parameter from the first received data set according to a deletion sequence 762. Similarly, the system 760 may include one or more instructions 710 loaded on the digital data storage device 706 that, when executed by the processing unit 704, further configure the computing device 702 to delete the instance of data related to the received parameter from the first received data set according to a deletion sequence, the deletion sequence having a substantially first-in, first-out order 764.

Figure 21:
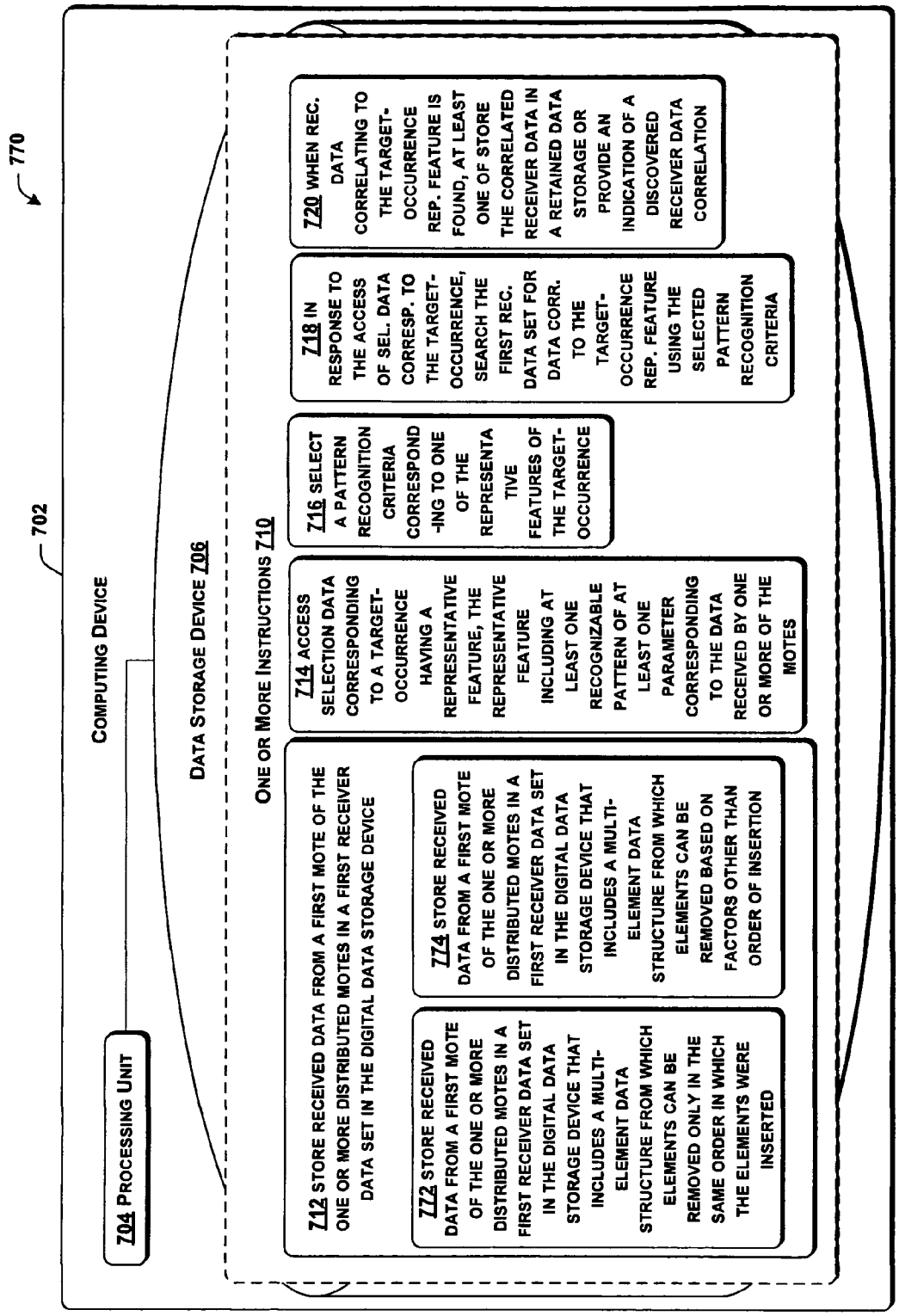

FIG. 21 shows a schematic view of a system 770 in accordance with further embodiments in accordance with the teachings of the present disclosure. As shown in FIG. 21, in some implementations, the one or more instructions loaded on the digital data storage device that, when executed by the processing unit, configure the computing device to store received data from a first mote of the one or more distributed motes in a first receiver data set in the digital data storage device 712 may include one or more instructions loaded on the digital data storage device that, when executed by the processing unit, configure the computing device to store received data from a first mote of the one or more distributed motes in a first receiver data set in the digital data storage device that includes a multi-element data structure from which elements can be removed only in the same order in which the elements were inserted 766. Similarly, in further implementations, the one or more instructions loaded on the digital data storage device that, when executed by the processing unit, configure the computing device to store received data from a first mote of the one or more distributed motes in a first receiver data set in the digital data storage device 712 may include one or more instructions loaded on the digital data storage device that, when executed by the processing unit, configure the computing device to store received data from a first mote of the one or more distributed motes in a first receiver data set in the digital data storage device that includes a multi-element data structure from which elements can be removed based on factors other than order of insertion 768.

Figure 22:
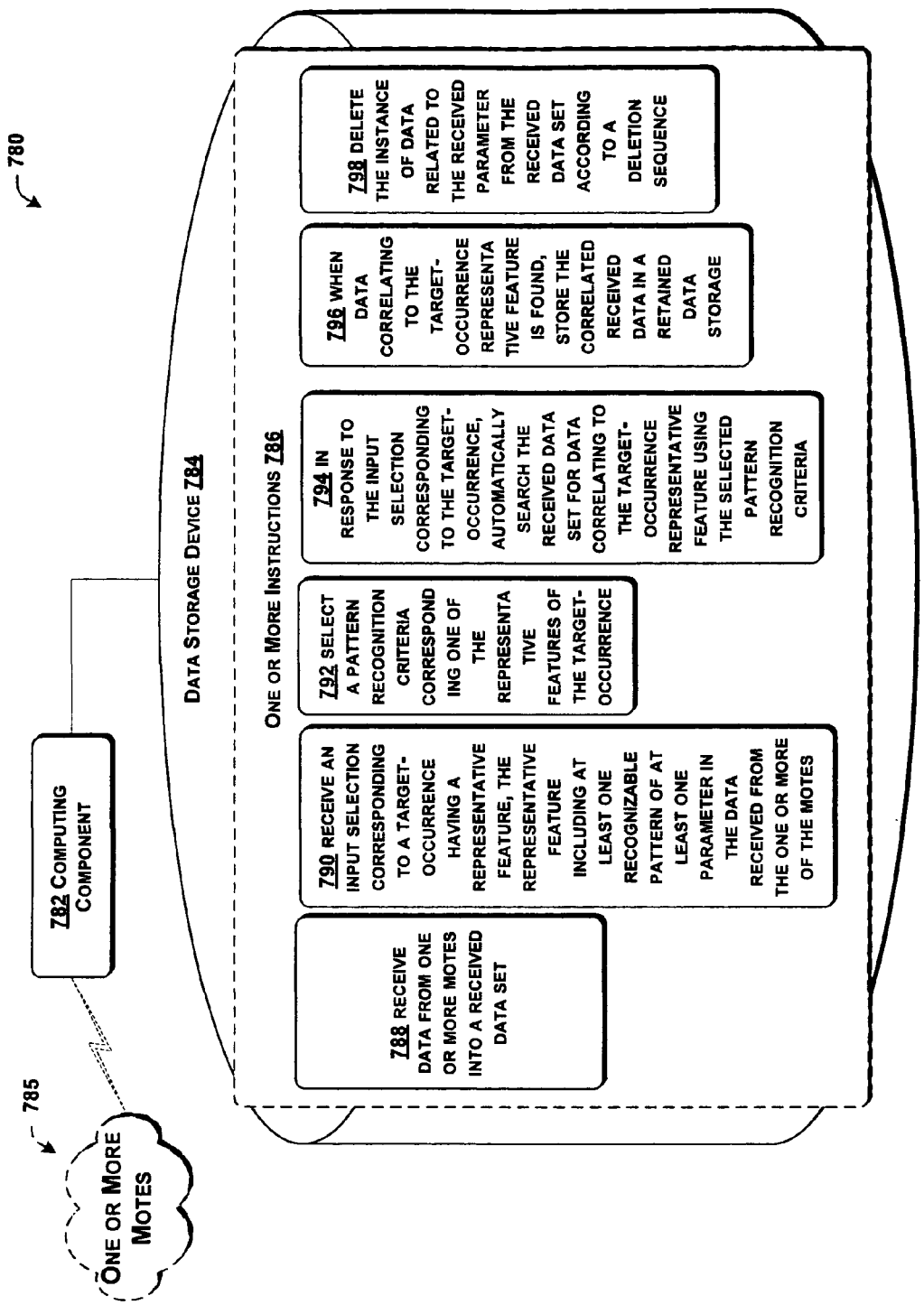

FIG. 22 shows a schematic view of a system 780 in accordance with further embodiments in accordance with the teachings of the present disclosure. As shown in FIG. 28, in some implementations, the system 780 includes a computing component 782 (e.g. processor, ASIC, computer, circuitry, analog device, FPGA, PLD, etc.) coupled with a digital data storage device 784 and operable to receive data from one or more motes 785, the data representing a feature having a correlation to an occurrence. One or more instructions 786 may be loaded on the digital data storage device 784 that, when executed by the computing component 782, configure the computing component 782 to receive data from one or more motes into a received data set 788, receive an input selection corresponding to a target-occurrence having a representative feature, the representative feature including at least one recognizable pattern of at least one parameter in the data received from the one or more of the motes 790, select a pattern recognition criteria corresponding one of the representative features of the target-occurrence 792, and in response to the input selection corresponding to the target-occurrence, automatically search the received data set for data correlating to the target-occurrence representative feature using the selected pattern recognition criteria 794.

As further shown in FIG. 22, in some implementations, the one or more instructions loaded on the data storage device may further configure the computing component 782 to, when data correlating to the target-occurrence representative feature is found, store the correlated received data in a retained data storage 796. Similarly, in some implementations, the one or more instructions loaded on the data storage device may further configure the computing component 782 to delete the instance of data related to the received parameter from the received data set according to a deletion sequence 798.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. In one embodiment, several portions of the subject matter subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into mote processing systems. That is, at least a portion of the devices and/or processes described herein can be integrated into a mote processing system via a reasonable amount of experimentation. Those having skill in the art will recognize that a typical mote processing system generally includes one or more of a memory such as volatile and non-volatile memory, processors such as microprocessors and digital signal processors, computational entities such as operating systems, user interfaces, drivers, sensors, actuators, applications programs, one or more interaction devices, such as USB ports, control systems including feedback loops and control motors (e.g., feedback for sensing position and/or velocity; control motors for moving and/or adjusting components and/or quantities). A typical mote processing system may be implemented utilizing any suitable available components, such as those typically found in mote-appropriate computing/communication systems, combined with standard engineering practices. Specific examples of such components include commercially described components such as Intel Corporation's mote components and supporting hardware, software, and firmware.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular aspects of the present subject matter described herein have been shown and described, it will be obvious to those skilled in the art that, based upon the teachings herein, changes and modifications may be made without departing from this subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should NOT be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" and/or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense of one having skill in the art would understand the convention (e.g., "a system having at least one of A, B, and C" would include but not be limited to systems that have A alone, B alone, C alone, A and B together, A and C together, B and C together, and/or A, B, and C together). In those instances where a convention analogous to "at least one of A, B, or C, etc." is used, in general such a construction is intended in the sense of one having skill in the art would understand the convention (e.g., "a system having at least one of A, B, or C" would include but not be limited to systems that have A alone, B alone, C alone, A and B together, A and C together, B and C together, and/or A, B, and C together).

Although the present invention has been described in considerable detail with reference to certain preferred embodiments, other embodiments are possible. Therefore, the spirit or scope of the appended claims should not be limited to the description of the embodiments contained herein.

What is claimed is:

1. A system, comprising:
   one or more motes, each mote being respectively operable to obtain and communicate sensor data related to at least one parameter;
   a computing device operable to communicate with the one or more motes, the computing device having a processing unit coupled to a data storage device; and
   one or more instructions loaded on the data storage device that, when executed by the processing unit, configure the computing device to:
      store an instance of sensor data related to the at least one parameter received from at least one mote of the one or more motes in a received data set in the data storage device;
      receive an input selection defining an event corresponding to a target-occurrence, the target-occurrence having a representative feature including at least one recognizable pattern of sensor data obtained by the at least one mote of the one or more motes and related to the at least one parameter;
      in response to the input selection defining the event corresponding to the target-occurrence, search the received data set for sensor data correlating to the representative feature of the target-occurrence;
      when received sensor data correlating to the representative feature of the target-occurrence is found, store the correlated received sensor data in a retained data storage; and
      delete the instance of sensor data related to the at least one parameter from the received data set according to a deletion sequence, wherein the deletion sequence includes deleting searched sensor data not correlated to the representative feature of the target-occurrence.

2. The system of claim 1, wherein the one or more motes includes:
   one or more motes operable to obtain and communicate data related to a parameter sensed by a sensor.

3. The system of claim 2, wherein the one or more motes operable to obtain and communicate data related to a parameter sensed by a sensor includes:
   one or more motes operable to obtain and communicate data related to a parameter selected from a group consisting of optical, acoustic, pressure, temperature, thermal, acceleration, magnetic, biological, chemical, and motion.

4. The system of claim 2, wherein the one or more motes operable to obtain and communicate data related to a parameter sensed by a sensor includes:
   one or more motes operable to obtain and communicate data related to a parameter related to at least one of infrared, visible, and ultraviolet light.

5. The system of claim 1, wherein the one or more motes, each mote being respectively operable to obtain and communicate data related to at least one parameter includes:
   one or more motes operable to obtain and communicate data related to a chronological sequence.

6. The system of claim 1, wherein the one or more motes, each mote being respectively operable to obtain and communicate data related to at least one parameter includes:
   one or more motes having a unique identifier.

7. The system of claim 6, wherein the one or more motes having a unique identifier includes:
   one or more motes operable to communicate the unique identifier in an association with the obtained data related to the at least one parameter.

8. The system of claim 1, wherein the one or more instructions loaded on the data storage device further configure the computing device to:
   store another instance of sensor data related to the at least one parameter from at least one mote of the plurality of motes in a sensor data set in the data storage device;
   search the sensor data set for sensor data correlating to the representative feature of the target-occurrence; and
   when sensor data correlating to the representative feature of the target-occurrence is found, store the correlated sensor data in the retained data storage.

9. The system of claim 8, wherein the another instance of sensor data is not a redundant data.

10. An occurrence-data storage system, comprising:
    a computing device having a processing unit coupled to a digital data storage device and being operable to communicate with one or more distributed motes, each mote operable to obtain sensor data having at least one parameter representing a feature, and to communicate the obtained sensor data to the computing device, the feature having a correlation to an occurrence; and
    one or more instructions loaded on the digital data storage device that, when executed by the processing unit, configure the computing device to:
       store the received sensor data from a first mote of the one or more distributed motes in a first receiver data set in the digital data storage device;
       access selection data corresponding to a target-occurrence having a representative feature, the representative feature including at least one recognizable pattern of at least one parameter corresponding to the sensor data obtained by one or more of the one or more distributed motes;
       select a pattern recognition criteria corresponding to the representative feature of the target-occurrence; and
       in response to the accessing of selection data corresponding to the target-occurrence, search the first receiver data set for sensor data correlating to the representative feature of the target-occurrence using the selected pattern recognition criteria; and
       when sensor data correlating to the representative feature of the target-occurrence is found, perform at least one of store the correlated sensor data in a retained data storage or provide an indication of a discovered sensor data correlation; and
       delete the received sensor data having the respective parameter from the first receiver data set according to a deletion sequence, wherein the deletion sequence includes deleting searched sensor data not correlated to the representative feature of the target-occurrence.

11. The system of claim 10, wherein
    when sensor data correlating to the target-occurrence representative feature is found, store the correlated sensor data in the retained data storage that is local to the first mote.

12. The system of claim 10, wherein
    when sensor data correlating to the target-occurrence representative feature is found, store the correlated sensor data in the retained data storage that is local to the computing device.

13. The system of claim 10, wherein
    when sensor data correlating to the target-occurrence representative feature is found, store the correlated sensor data in the retained data storage that is a remote digital storage device.

14. The system of claim 10, wherein
when sensor data correlating to the target-occurrence representative feature is found, store the correlated sensor data in a controlled-access data storage.

15. The system of claim 10, wherein the computing device is being operable to communicate with the one or more distributed motes over a communications link.

16. The system of claim 15, wherein the communications link includes at least one of an optical link, a wireless link, or a wired link.

17. The system of claim 15, wherein the communications link includes an intermediate mote that relays a communication between one or more other motes and the computing device.

18. The system of claim 10, wherein the one or more instructions configure the computing device to receive the target-occurrence from a program.

19. The system of claim 18, wherein the program is running on another computing device.

20. The system of claim 10, wherein the one or more instructions configure the computing device to automatically select a pattern recognition criteria corresponding to the representative feature of the target-occurrence in response to a user selected target-occurrence.

21. The system of claim 10, wherein the one or more instructions configure the computing device to automatically select a pattern recognition criteria corresponding to the representative feature of the target-occurrence in response to a characteristic of a user selected target-occurrence.

22. The system of claim 10, wherein the first receiver data set includes a multi-element data structure from which elements can be removed only in the same order in which the elements were inserted.

23. An occurrence-data storage system, comprising:
a data storage device coupled with a computing component operable to receive sensor data from one or more motes, the sensor data having at least one parameter representing a feature having a correlation to an occurrence; and
one or more instructions loaded on the data storage device that, when executed by the computing component, configure the computing component to:
receive sensor data from the one or more motes into a received data set;
receive an input selection defining an event corresponding to a target-occurrence having a representative feature, the representative feature including at least one recognizable pattern of at least one parameter in the sensor data received from the one or more motes;
select a pattern recognition criteria corresponding to the representative feature of the target-occurrence; and
in response to the input selection defining the event corresponding to the target-occurrence, automatically search the received data set for sensor data correlating to the representative feature of the target-occurrence using the selected pattern recognition criteria;
when received sensor data correlating to the representative feature of the target-occurrence is found, store the correlated received sensor data in a retained data storage; and
delete the sensor data related to the at least one parameter from the received data set according to a deletion sequence, wherein the deletion sequence includes deleting searched sensor data not correlated to the representative feature of the target-occurrence.

24. The system of claim 23, wherein the one or more instructions loaded on the data storage device further configure the computing component to:
when data correlating to the target-occurrence representative feature is found, store the correlated received data in a retained data storage.

* * * * *